US012807137B2

(12) United States Patent
Beinborn et al.

(10) Patent No.: US 12,807,137 B2
(45) Date of Patent: Nov. 24, 2026

(54) SYSTEMS AND METHODS FOR CAMERA-BASED POWERTRAIN DIAGNOSTIC AND CONTROL

(71) Applicant: Cummins Inc., Columbus, IN (US)

(72) Inventors: Aaron William Beinborn, Greenwood, IN (US); David P. Genter, Columbus, IN (US); Carlos Alcides Lana, Columbus, IN (US); Kenneth M. Follen, Greenwood, IN (US); Harsha Ravindra Ademane, Columbus, IN (US); Ke Li, Columbus, IN (US); Agneya Turlapati, Indianapolis, IN (US)

(73) Assignee: Cummins Inc, Columbus, IN (US)

( * ) Notice: Subject to any disclaimer, the term of this patent is extended or adjusted under 35 U.S.C. 154(b) by 37 days.

(21) Appl. No.: 18/717,989

(22) PCT Filed: Dec. 13, 2022

(86) PCT No.: PCT/US2022/052711

§ 371 (c)(1),
(2) Date: Jun. 7, 2024

(87) PCT Pub. No.: WO2023/114212

PCT Pub. Date: Jun. 22, 2023

(65) Prior Publication Data

US 2025/0050874 A1 Feb. 13, 2025

Related U.S. Application Data

(60) Provisional application No. 63/289,228, filed on Dec. 14, 2021.

(51) Int. Cl.
*B60W 30/09* (2012.01)

(52) U.S. Cl.
CPC ....... *B60W 30/09* (2013.01); *B60W 2420/403* (2013.01); *B60W 2554/802* (2020.02)

(58) Field of Classification Search
CPC ........... B60W 30/09; B60W 2420/403; B60W 2554/802; B60W 2420/40
See application file for complete search history.

(56) References Cited

U.S. PATENT DOCUMENTS 6,290,594 B1 9/2001 Osborne
6,407,389 B1 6/2002 Nishii et al.
(Continued)

FOREIGN PATENT DOCUMENTS

CN 105004999 A 10/2015
CN 104476986 B * 1/2017
(Continued)

OTHER PUBLICATIONS

EPO machine translated description of CN-104476986-B. (Year: 2017).*
(Continued)

*Primary Examiner* — Navid Z. Mehdizadeh
*Assistant Examiner* — Shelley Marie Osterhout
(74) *Attorney, Agent, or Firm* — Foley & Lardner LLP

(57) ABSTRACT

A vehicle system includes a camera coupled to a controller. The controller includes at least one processor coupled to at least one memory device storing instructions that, when executed by the at least one processor, cause controller to perform operations including: receive data from the camera regarding at least one of an internal or an external condition of the vehicle system; determine that the data is indicative of a certain predefined condition; and adjust operation of a vehicle powertrain based on the determined certain predefined condition.

20 Claims, 5 Drawing Sheets

(56) References Cited

U.S. PATENT DOCUMENTS

| | | | |
|---|---|---|---|
| 6,866,089 B2 | 3/2005 | Avila | |
| 8,050,813 B2 | 11/2011 | Stempnik et al. | |
| 8,087,301 B2 | 1/2012 | Hammerschmidt et al. | |
| 8,193,496 B2 | 6/2012 | Furry | |
| 8,392,057 B2 | 3/2013 | Wright et al. | |
| 9,610,949 B2 | 4/2017 | Healey et al. | |
| 9,759,630 B2 | 9/2017 | Xu et al. | |
| 9,864,918 B2 | 1/2018 | Micks et al. | |
| 9,937,792 B2 | 4/2018 | Nania | |
| 10,078,892 B1 | 9/2018 | Wang et al. | |
| 10,235,859 B1 | 3/2019 | Hiles | |
| 10,636,227 B2 | 4/2020 | Wittmann et al. | |
| 2008/0083526 A1* | 4/2008 | Young | G01K 17/06 374/E17.01 |
| 2010/0080416 A1 | 4/2010 | Lee et al. | |
| 2010/0100275 A1 | 4/2010 | Mian et al. | |
| 2012/0038492 A1 | 2/2012 | Maggiore et al. | |
| 2017/0177959 A1 | 6/2017 | Boos | |
| 2019/0217848 A1 | 7/2019 | Geller et al. | |
| 2019/0291726 A1 | 9/2019 | Shalev-Shwartz et al. | |
| 2020/0118367 A1* | 4/2020 | Dudar | F02D 29/02 |
| 2021/0046918 A1 | 2/2021 | Pan et al. | |
| 2021/0047971 A1 | 2/2021 | Turner et al. | |
| 2021/0272455 A1 | 9/2021 | Kazuno | |
| 2022/0363289 A1* | 11/2022 | Nehmadi | B60W 40/06 |
| 2022/0407174 A1* | 12/2022 | Sandahl | H01M 50/249 |
| 2023/0152652 A1* | 5/2023 | Trikha | G06F 3/147 700/276 |

FOREIGN PATENT DOCUMENTS

| | | |
|---|---|---|
| CN | 209952082 U | 1/2020 |
| EP | 1 413 869 A1 | 4/2004 |
| EP | 3 308 353 A1 | 4/2018 |
| KR | 101977578 B1 | 5/2019 |
| WO | WO-2014/149657 A1 | 9/2014 |
| WO | WO-2018/044378 A1 | 3/2018 |
| WO | WO-2019/145976 A1 | 8/2019 |

OTHER PUBLICATIONS

PCT International Search Report and Written Opinion for International Application No. PCT/US2022/052711 mailing date Mar. 17, 2023, 16 pages.

Wei “Modeling and control of a hybrid electric drivetrain for optimum fuel economy, performance and driveability.” The Ohio State University, 2004. pp. 133-139. Retrieved on Feb. 22, 2023. Retrieved from <URL: https://etd,ohiollnk.edu/apexprod/rws_etd/send_file/send?accession=osu1095960915&disposition=inline>.

Extended Search Report issued for European Patent Application No. 22908324.1 issued Dec. 1, 2025.

* cited by examiner

SYSTEMS AND METHODS FOR CAMERA-BASED POWERTRAIN DIAGNOSTIC AND CONTROL

CROSS-REFERENCE TO RELATED APPLICATIONS

This application is a National Stage Application of International Application No. PCT/US2022/052711, filed Dec. 13, 2022, which claims priority to and the benefit of U.S. Application No. 63/289,228, filed Dec. 14, 2021, both of which are incorporated herein by reference in their entireties and for all purposes.

TECHNICAL FIELD

The present disclosure relates to managing a powertrain of a vehicle based on feedback from one or more cameras included with the vehicle.

BACKGROUND

In a vehicle, the powertrain or powertrain system refers to the components that provide the power to propel the vehicle. These components include an engine, transmission, drive/propeller shaft, differentials, and final drive among potentially other components/systems. In operation and for an internal combustion engine, the engine combusts a fuel to generate mechanical power in the form of a rotating crankshaft. The transmission receives the rotating crankshaft and manipulates the engine speed (i.e., the rotation of the crankshaft) to control a rotational speed of the drive/propeller shaft, which is also coupled to the transmission. The rotating drive shaft is received by a differential, which transmits the rotational power to a final drive (e.g., wheels) to cause a movement of the vehicle.

In regards to a hybrid vehicle, conventional hybrid engine systems generally include both an electric motor or motor(s) and an internal combustion engine that function to provide power to propel the vehicle. A hybrid vehicle can have various configurations. For example, in a parallel configuration, both the electric motor and the internal combustion engine are operably connected to the drivetrain/transmission to propel the vehicle. In a series configuration, the electric motor is operably connected to the drivetrain/transmission and the internal combustion engine indirectly powers the drivetrain/transmission by powering the electric motor (examples include extended range electric vehicles or range-extended electric vehicles).

Some vehicles further include a camera system. However, the primary function of the camera system is to aid/improve an operator experience (e.g., back-up camera, front camera that depicts how close the vehicle is to an object in front of the vehicle, etc.).

SUMMARY

One embodiment relates to a vehicle system. The vehicle system includes a camera coupled to a controller. The controller includes at least one processor coupled to at least one memory device storing instructions that, when executed by the at least one processor, cause controller to perform operations including: receive data from the camera regarding at least one of an internal or an external condition of the vehicle system; determine that the data is indicative of a certain predefined condition; and adjust operation of a vehicle powertrain based on the determined certain predefined condition.

In one embodiment, the instructions, when executed by the at least one processor, further cause the controller to generate a fault code in response to the determination that the data is indicative of the certain predefined condition. Additionally, the instructions, when executed by the at least one processor, further cause the controller to generate a command to increase a power output from an electric motor of the vehicle powertrain to meet or substantially meet a vehicle power demand. Adjusting operation of the vehicle powertrain comprises at least one of increasing or decreasing a power output relative to a current power output from the vehicle powertrain. The data received from the camera comprises at least one of data indicative of a road condition, a road grade, a road signage, a temperature regarding a component of the vehicle powertrain, or a combination thereof.

In one embodiment, the instructions, when executed by the at least one processor, further cause the controller to: receive data from a hydrogen sensor regarding at least one of an internal or an external condition of the vehicle system; correlate the data from the hydrogen sensor and the data from the camera; determine a level of risk for the vehicle system based on the correlation; and adjust operation of a vehicle powertrain based on the determined risk level.

Another embodiment relates to a method for operating a vehicle system. The method includes: receiving, by a controller, data from a camera regarding at least one of an internal or an external condition of the vehicle system; determining, by the controller, that the data is indicative of a certain predefined condition; and, adjusting, by the controller, operation of a vehicle powertrain based on the determined certain predefined condition.

Yet another embodiment relates to a non-transitory computer readable medium having computer-executable instructions stored thereon that, when executed by at least one processor, causes the at least one processor to perform operations including: receiving data from a camera regarding at least one of an internal or an external condition of a vehicle system; determining that the data is indicative of a certain predefined condition; and adjusting operation of a vehicle powertrain based on the determined certain predefined condition.

This summary is illustrative only and is not intended to be in any way limiting. Other aspects, features, and advantages of the devices or processes described herein will become apparent in the detailed description set forth herein, taken in conjunction with the accompanying figures, wherein like reference numerals refer to like elements.

Numerous specific details are provided to impart a thorough understanding of embodiments of the subject matter of the present disclosure. The described features of the subject matter of the present disclosure may be combined in any suitable manner in one or more embodiments and/or implementations. In this regard, one or more features of an aspect of the invention may be combined with one or more features of a different aspect of the invention. Moreover, additional features may be recognized in certain embodiments and/or implementations that may not be present in all embodiments or implementations.

DETAILED DESCRIPTION

Figure 1:
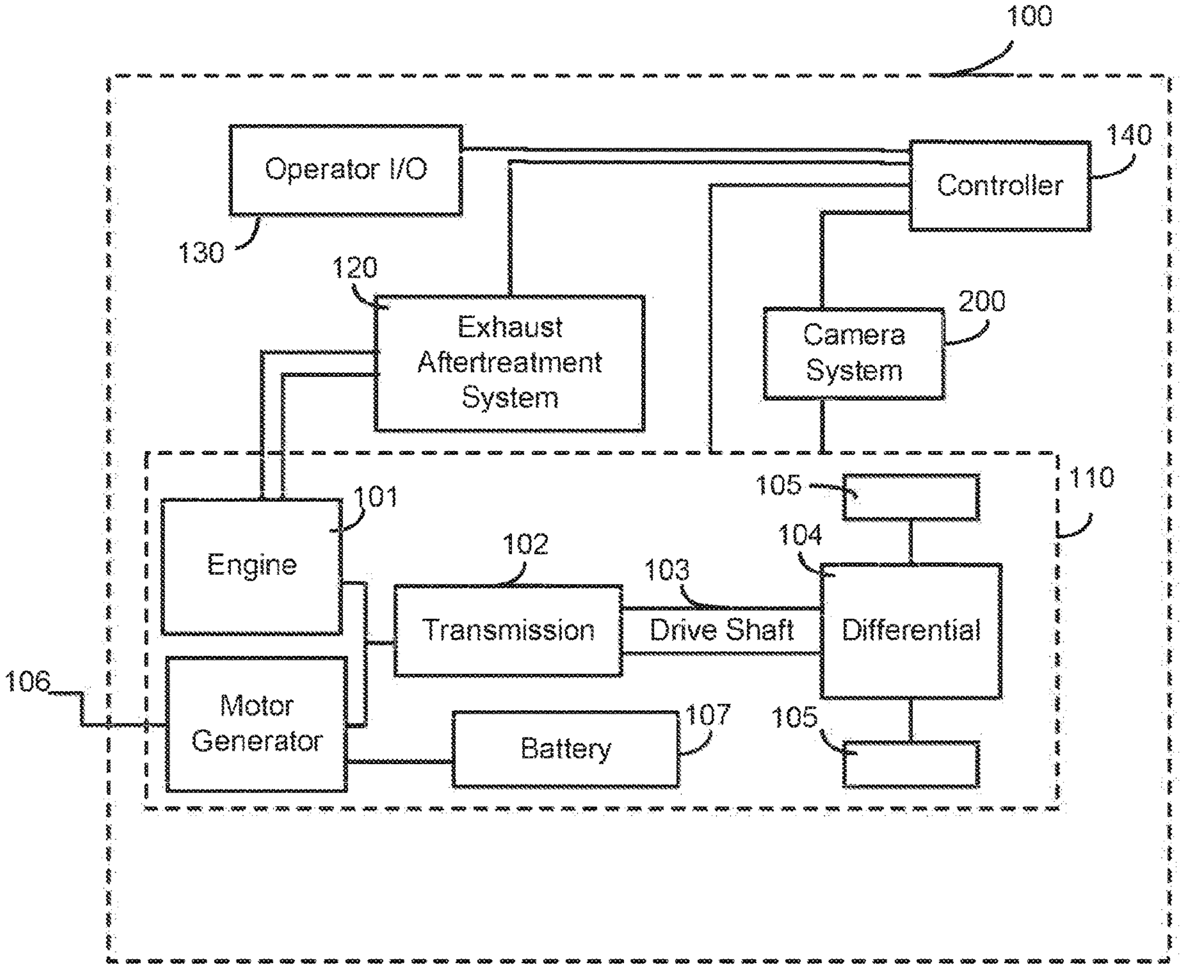
FIG. 1 is a schematic view of a block diagram of a vehicle, according to an example embodiment.

Following below are more detailed descriptions of various concepts related to, and implementations of, methods, apparatuses, and systems to diagnose and control a powertrain of a vehicle based on camera feedback from one or more cameras included with the vehicle. Before turning to the Figures, which illustrate certain exemplary embodiments in detail, it should be understood that the present disclosure is not limited to the details or methodology set forth in the description or illustrated in the Figures. It should also be understood that the terminology used herein is for the purpose of description only and should not be regarded as limiting.

Referring to the Figures generally, systems, apparatuses, and methods for utilizing on-vehicle cameras to detect, diagnose and/or attempt to prevent powertrain components failures, to optimize powertrain performance, and provide/enable smarter driver assistance are shown and described herein, according to various embodiments. In other words, the described systems, methods, and apparatuses may improve powertrain performance with camera information, improve the diagnostics and/or prognostics of powertrain with camera information, and improve overall operator/customer experience. As described herein, a controller is coupled to at least one camera of an on-board camera system. The controller periodically receives information from one or more cameras of the on-board camera system. The controller utilizes the camera information to improve powertrain performance, provide early potential issue detection (e.g., improve diagnostics and/or prognostics of the vehicle that may reduce downtime, warranty costs, and maintenance costs and in turn result in improved powertrain products), improve certain operating characteristics (e.g., fuel economy and reduced emissions), and other benefits described herein.

In particular, a vehicle system includes at least one camera having a processing unit, which can be a standalone module or disposed inside the controller, and a powertrain system (e.g., internal combustion engine, electric machine, battery, transmission, etc.). The controller processes image information from the at least one camera, and utilizes the information to optimize the powertrain performance and/or to diagnose to prevent or attempt to prevent potential issues with one or more powertrain components. As a specific example, the camera may take, obtain, or otherwise acquire images regarding one or more external objects (e.g., road conditions, etc.). The images may be provided to the controller. The controller may analyze the received images to determine that a certain condition is present. For instance, an image may indicate an object present in the road (e.g., another vehicle ahead of the current vehicle). Based on the image, the controller determines a distance between the vehicle and the object. The controller may then determine a desired power output to avoid a collision and determine the amount of change required relative to the current power output. Using the determined distance and amount of change required, the controller commands the powertrain system to achieve the desired power output. Prediction and road condition identification with camera information is used to improve powertrain performance in terms of fuel economy, emissions, and drivability. Additionally and as described herein, the camera may acquire an image of one or more internal objects (e.g., cylinder head, manifold cover, etc.). Based on the images of the one or more internal objects, the controller may perform component diagnostic and prognostics to prevent or attempt to prevent component failure.

The systems and methods may be used with any vehicle type (e.g., internal combustion engine, electric vehicle (EV) such as a battery electric vehicle (BEV), hybrid electric vehicle (HEV), fuel cell electric vehicle (FCEV), PHEV, etc.) wherein the vehicle type may use one or more of a variety of types of fuel (e.g., gasoline, diesel, ethanol, biodiesel, propane, compressed natural gas, electric batteries, hydrogen, etc.). Additionally, it should be understood that the camera system may have a variety of configurations, such as the placement and type of cameras utilized (e.g., a camera located either inside the cab (e.g., close to the windshield), a camera positioned outside of the cab, a combination thereof, etc.). These and other features and benefits are described more fully herein below.

Referring now to FIG. 1, a vehicle 100 is shown, according to an example embodiment. The vehicle 100 includes a powertrain system 110, an aftertreatment system 120, an operator input/output (I/O) device 130, a controller 140, and a camera system 200 among other components/systems, whereby the controller 140 is communicably coupled to each of the aforementioned components/systems. The vehicle 100 may be an on-road or an off-road vehicle including, but not limited to, line-haul trucks, mid-range trucks (e.g., pick-up trucks), tanks, airplanes, and other types of vehicle. In the example shown, the vehicle 100 is a hybrid vehicle. In an alternate embodiment, the vehicle may be a stationary vehicle, such as a power generator or genset, that includes one or more of an electrified motor, internal combustion engine, and an exhaust aftertreatment system.

The powertrain system 110 is shown as an electrified powertrain system including an engine 101 and a motor generator 106, among other components. The powertrain system 110 facilitates power transfer from the engine 101 and/or motor generator 106 to power and/or propel the vehicle 100 (e.g., move the vehicle forward, backward, etc.). The powertrain system 110 includes the engine 101 and the motor generator 106 operably coupled to a transmission 102 that is operatively coupled to a drive shaft 103, which is operatively coupled to a differential 104, where the differential 104 transfers power output from the engine 101 and/or motor generator 106 to the final drive (shown as wheels 105) to propel the vehicle 100.

As a brief overview, the engine 101 receives a chemical energy input (e.g., a fuel such as gasoline or diesel) and combusts the fuel to generate mechanical energy, in the form of a rotating crankshaft. In comparison, the motor generator 106 may also be in a power receiving relationship with an energy source, such as the battery 107 that provides an input energy to output usable work or energy to in some instances propel the vehicle 100 alone or in combination with the engine 101. In this configuration, the hybrid vehicle has a parallel drive configuration. However, it should be understood, that other configurations of the vehicle 100 are intended to fall within the spirit and scope of the present disclosure (e.g., a series configuration, etc.). As a result of the power output from at least one of the engine 101 and/or the motor generator 106, the transmission 102 may manipulate the speed of the rotating input shaft (e.g., the crankshaft) to effect a desired drive shaft 103 speed. The rotating drive shaft 103 is received by a differential 104, which provides the rotational energy of the drive shaft 103 to the final drive 105. The final drive 105 then propels or moves the vehicle 100.

The transmission 102 may be structured as any type of transmission, such as a continuous variable transmission, a manual transmission, an automatic transmission, an automatic-manual transmission, a dual clutch transmission, etc. Accordingly, as transmissions vary from geared to continuous configurations (e.g., continuous variable transmission), the transmission can include a variety of settings (gears, for a geared transmission) that affect different output speeds based on the engine speed. Like the engine 101 and the transmission 102, the drive shaft 103, differential 104, and final drive 105 may be structured in a configuration dependent on the application (e.g., the final drive 105 is structured as wheels in an automotive application and a propeller in an airplane application). Further, the drive shaft 103 may be structured as a one-piece, two-piece, and a slip-in-tube driveshaft based on the application.

The engine 101 is an internal combustion engine (e.g., compression-ignition or spark-ignition). Depending on the engine 101 structure, the engine 101 may be powered by various fuel types (e.g., diesel, ethanol, gasoline, etc.). The engine 101 includes one or more cylinders and associated pistons. In the example shown, the engine 101 is a diesel powered compression-ignition engine. Air from the atmosphere is combined with fuel and combusted to produce power for the vehicle. Combustion of the fuel and air in the compression chambers of the engine 101 produces exhaust gas that is operatively vented to an exhaust pipe and to the exhaust aftertreatment system. The engine 101 may be coupled to a turbocharger (not shown). The turbocharger includes a compressor coupled to an exhaust gas turbine via a connector shaft. Generally, hot exhaust gasses spin the turbine which rotates the shaft and in turn, the compressor, which draws air in. By compressing the air, more air can enter the cylinders, or combustion chamber, thus burning more fuel and increasing power and efficiency. A heat exchanger, such as a charge air cooler, may be used to cool the compressed air before the air enters the cylinders. In some embodiments, the turbocharger is omitted.

Although referred to as a "motor generator" 106 herein, thus implying its ability to operate as both a motor and a generator, it is contemplated that the motor generator component, in some embodiments, may be an electric generator separate from the electric motor (i.e., two separate components) or just an electric motor. Further, the number of electric motors or motor generators may vary in different configurations. The principles and features described herein are also applicable to these other configurations. Among other features, the motor generator 106 may include a torque assist feature, a regenerative braking energy capture ability, and a power generation ability (i.e., the generator aspect). In this regard, the motor generator 106 may generate a power output and drive the transmission 102. The motor generator 106 may include power conditioning devices such as an inverter and a motor controller, where the motor controller may be coupled to the controller 140. In other embodiments, the motor controller may be included with the controller 140.

The battery 107 may be configured as any type of rechargeable (i.e., primary) battery and of any size. In some embodiments, the battery 107 may be other electrical energy storing and providing devices, such as one or more capacitors (e.g., ultra-capacitors, etc.). In still other embodiments, the battery 107 may be a battery system that includes one or more rechargeable batteries and energy storing and providing devices (e.g., ultra-capacitors, etc.). The battery 107 may be one or more batteries typically used or that may be used in hybrid vehicles (e.g., Lithium-ion batteries, Nickel-Metal Hydride batteries, Lead-acid batteries, etc.). The battery 107 may be operatively and communicably coupled to the controller 140 to provide data indicative of one or more operating conditions or parameters of the battery 107. The data may include a temperature of the battery, a current into or out of the battery, a number of charge-discharge cycles, a battery voltage, a state of charge (SOC), etc. As such, the battery 107 may include one or more sensors coupled to the battery 107 that acquire such data. In this regard, the sensors may include, but are not limited to, voltage sensors, current sensors, temperature sensors, etc.

Figure 2:
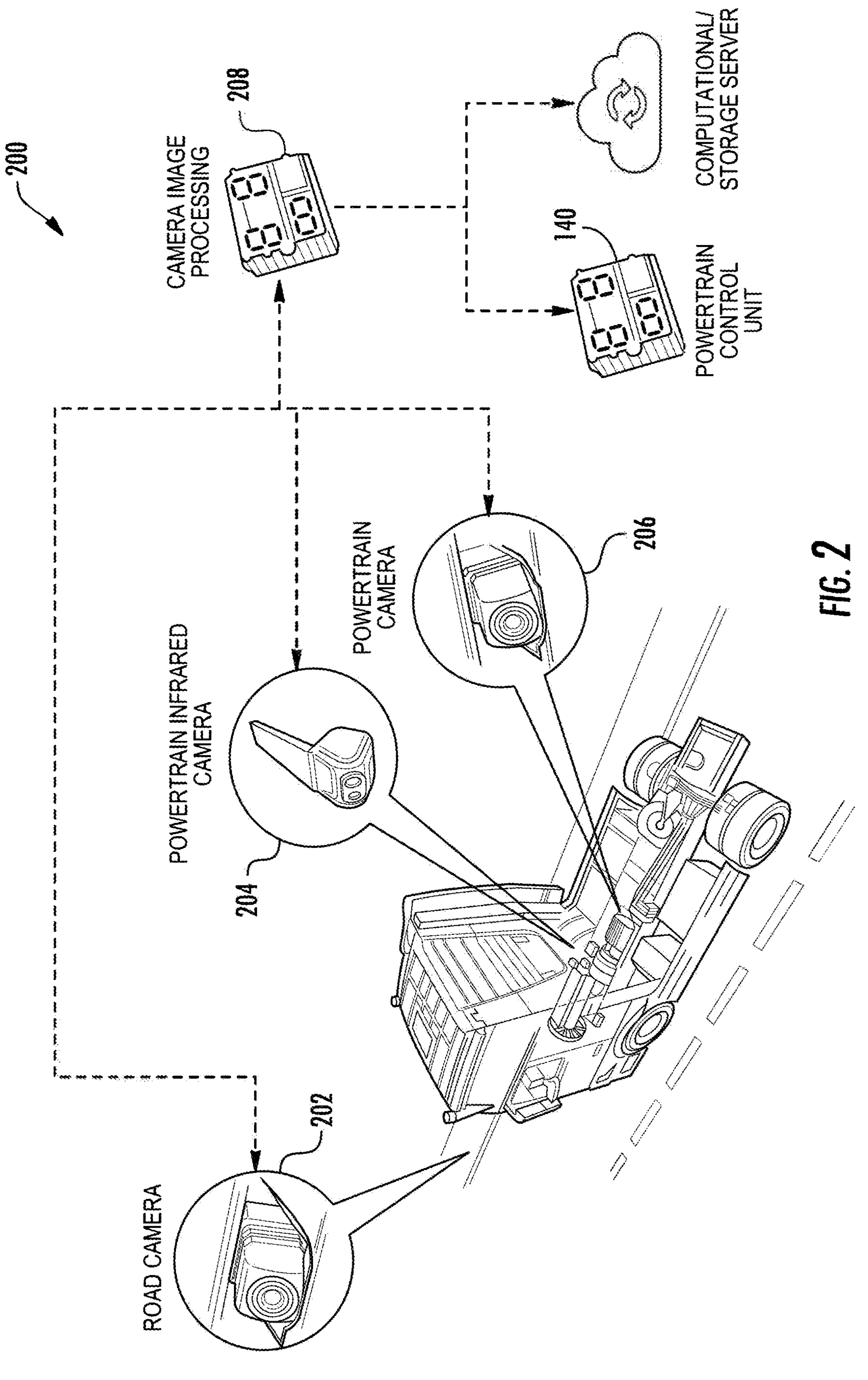
FIG. 2 is a schematic view of a camera system of the vehicle of FIG. 1, according to an example embodiment.

As also shown in FIG. 1, the vehicle 100 includes a camera system 200. Referring now to FIG. 2, the camera system 200 for the vehicle 100 is shown with more particularity, according to an example embodiment. It should be understood that the schematic depicted in FIG. 2 is but one implementation of a camera-based powertrain system. Additional, fewer, different, and/or the placement of various cameras is highly configurable and may change from application-to-application. The camera system 200 refers to a network/grouping of one or more cameras in the vehicle. While the term "camera" is used to herein, it should be understood that the camera may take photographs and/or videos depending on the camera structure (e.g., still photography versus video camera). The camera system 200 is coupled to the powertrain system 110 of the vehicle 100 and the controller 140. The controller 140 is configured to receive information or data from the camera system 200 to improve powertrain performance, improve diagnostics and/or prognostics of powertrain, and overall improve customer experiences.

In the example shown, the camera system 200 includes a road camera 202, a powertrain infrared camera 204, and a powertrain camera 206. The cameras may be a variety of camera-types. For instance the cameras may be a video camera, a thermal imaging camera, a LIDAR device, a traditional camera, a high definition camera, a time-lapse photo camera, etc., and/or a combination thereof among other various, different camera types. The number, placement, and type of cameras included in the camera system 200 is shown for example purposes only. In other configurations, the number, placement, and type of cameras employed in the system or vehicle may differ. In this regard and as described herein, the cameras of the camera system 200 may point outward to monitor road information and/or inward to monitor driver information. Further, one or more cameras may also be disposed within an engine compartment to take one or more images of the components located therein (e.g., the powertrain components). For example, infrared and/or thermal cameras may also be included to measure a temperature of certain vehicle components.

The road camera 202 is configured to capture images (still images and/or video images) regarding the external environment of the vehicle 100 (e.g., in front of the vehicle). For instance, the road camera 202 can capture images of traffic, weather, road conditions, presence of pedestrians, signage on a route of the vehicle 100, etc. Multiple road cameras 202 may be included with the vehicle 100 where each of the road cameras are configured to obtain images and/or video images regarding an external environment of the vehicle, such as an environment in front of the vehicle 100, behind the vehicle 100, on the sides of the vehicle 100, and/or a combination thereof.

The powertrain infrared camera 204 is configured to capture a thermal image of one or more powertrain components. As such, the camera 204 may be disposed within the engine compartment or, more generally, outside of a cab of the vehicle 100. The powertrain infrared camera 204 may be configured as an infrared or thermographic camera that utilizes infrared radiation (IR) to acquire information regarding a thermal distribution of an object of the camera 204 (i.e., areas of elevated temperature relative to areas of relatively less elevated temperatures). Accordingly, the powertrain infrared camera 204 may take images indicative of an object's temperature during operation of the object (e.g., crankshaft, etc.). The camera 204 may be used to aid diagnostics and prognostics performed by the controller 140 (or by a remote computing system coupled to the controller 140 and vehicle 100). This may be beneficial to operation of the vehicle and prolong useful life of the vehicle 100 components. For instance, in regards to an electric water pump and similar components that have the potential to seize, there is a risk of having high heat in proximity to hydrogen. Accordingly, the camera 204 may take images regarding gradients of heat within the same or different fluid paths of the water pump, such that the electric water pump may be commanded to either speed up or slow down depending on the gradients of heat within the same or different paths (e.g., slow operation if localized heat along a certain path is above a predefined temperature threshold). Thus and in operation, where the water pump speed is typically tied to the speed of the engine, the electric water pump can instead be controlled by the controller 140 independently based on information from the thermal imaging camera 204.

The powertrain camera 206 is configured to capture a regular image, as opposed to an infrared image, of one or more powertrain components. The image from the powertrain camera 206 may indicate wear of particular components, operating conditions of one of one or more components (e.g., a visible spark between various components, indicating overuse, malfunction, overheating, etc.), cleanliness or dirtiness of one or more components, a video of the operation of one or more components (e.g., rotation of the driveshaft, etc.), fluid levels (e.g., reductant fluid level, oil fluid level, etc.), and so on.

In operation, the road camera 202, the powertrain infrared camera 204, and the powertrain camera 206 may be used to detect various conditions regarding the vehicle 100. In this regard, the cameras may acquire information regarding external and internal operating conditions regarding the vehicle 100. When the conditions are indicative of certain predefined operating conditions (e.g., increase/decrease in speed limit, aftertreatment system temperatures below a threshold level, and so on), operation of the vehicle 100 may be adjusted. Regarding internal operating conditions and as a specific example, the powertrain infrared camera 204 and powertrain camera 206 may acquire information regarding a clog or a potential clog impacting a heat exchanger. A heat exchanger in the vehicle 100 may fail due to a dirty or clogged air filter. A clogged air filter restricts airflow and may overheat the heat exchanger, which may adversely result in stress cracks. Thus, the infrared camera 204 can may take an image indicating the presence of heat. In particular, the image may indicate localized heating above a predefined temperature threshold. The image is then analyzed by the controller 140 (e.g., the controller 140 compares the image to stored images to determine whether the heat presence is above a predetermined threshold) and the controller 140 determines an area of overheating via the infrared camera 204. Alternatively or additionally, the powertrain camera 206 may detect visible cracking. As still another example, the powertrain camera 206 may take one or more time-lapse images showing the restriction of air flow through the air filter (or, a build-up on a surface of the air filter of, for example, dirt, grime, etc.). Stored images indicating a restriction of air flow may be used by the controller 140 (or a remote computing system) to confirm the build-up. In which case, the controller 140 may implement various actions to address this potential undesired circumstance (e.g., generate a fault code, send a message to a remote attendant, etc.). As another example regarding internal operating conditions, the camera system 200 may be configured to monitor tire wear. Particularly, a regular imaging camera (e.g., a high definition camera, a video camera, etc.) may be positioned on the outside of the vehicle at or near the wheel well. The camera may monitor the metal around wheels and/or the tread on the tire, thus detecting damage, overuse, imbalanced use between the various tires. This may indicate to a user that the tire and/or rim needs to be replaced or balanced before further damage occurs. For instance, the camera may take a series of images regarding the tire over a predetermined period of time. The images are provided to the controller 140 for analysis (e.g., the controller 140 compares the images to each other and/or compares the images to stored images to determine whether the wear on the time is increasing rapidly, unevenly, etc.) where the controller 140 determines the need or potential need for a tire replacement (or other service event) based on the information from the camera. As a further example regarding internal operating conditions, coolant flow balance across multiple modules/packs and rotor temperatures may be detected via the infrared camera 204. As will be explained further herein, upon certain detections by the cameras, the engine 101, for instance, may be adjusted by the controller 140 accordingly. For example, fans may be reversed to expunge clogs from area if camera detection crosses threshold. Alternatively or additionally, certain warnings, service and/or solutions recommendations, etc. may be generated to alert the user.

The camera system 200 further includes a camera image processing circuit 208. The camera image processing circuit 208 can be a standalone processing circuit or disposed as a circuit of the controller 140. In the example shown, the camera image processing circuit 208 is separate from the controller 140 and provides processed images and/or other information to the controller 140. The camera image processing circuit 208 processes the images from cameras, and the controller 140 is structured to utilize this information to optimize the powertrain performance and/or diagnose or prevent or attempt to prevent potential issues of the powertrain components. Prediction and road condition identification with camera information is used to improve powertrain performance in terms of, for example, fuel economy, emissions, and drivability. Component diagnostic and prognostics with camera information is used to prevent component failure and reduce warranty costs. Additionally, improvement of driver/passenger experience with camera information can be achieved by providing customized powertrain performance and improved safety. In some embodiments and based on the received data, the controller 140 may generate one or more fault codes (e.g., OBD codes, diagnostic trouble codes, malfunction indicator lamps/lights, and so on).

Figure 3:
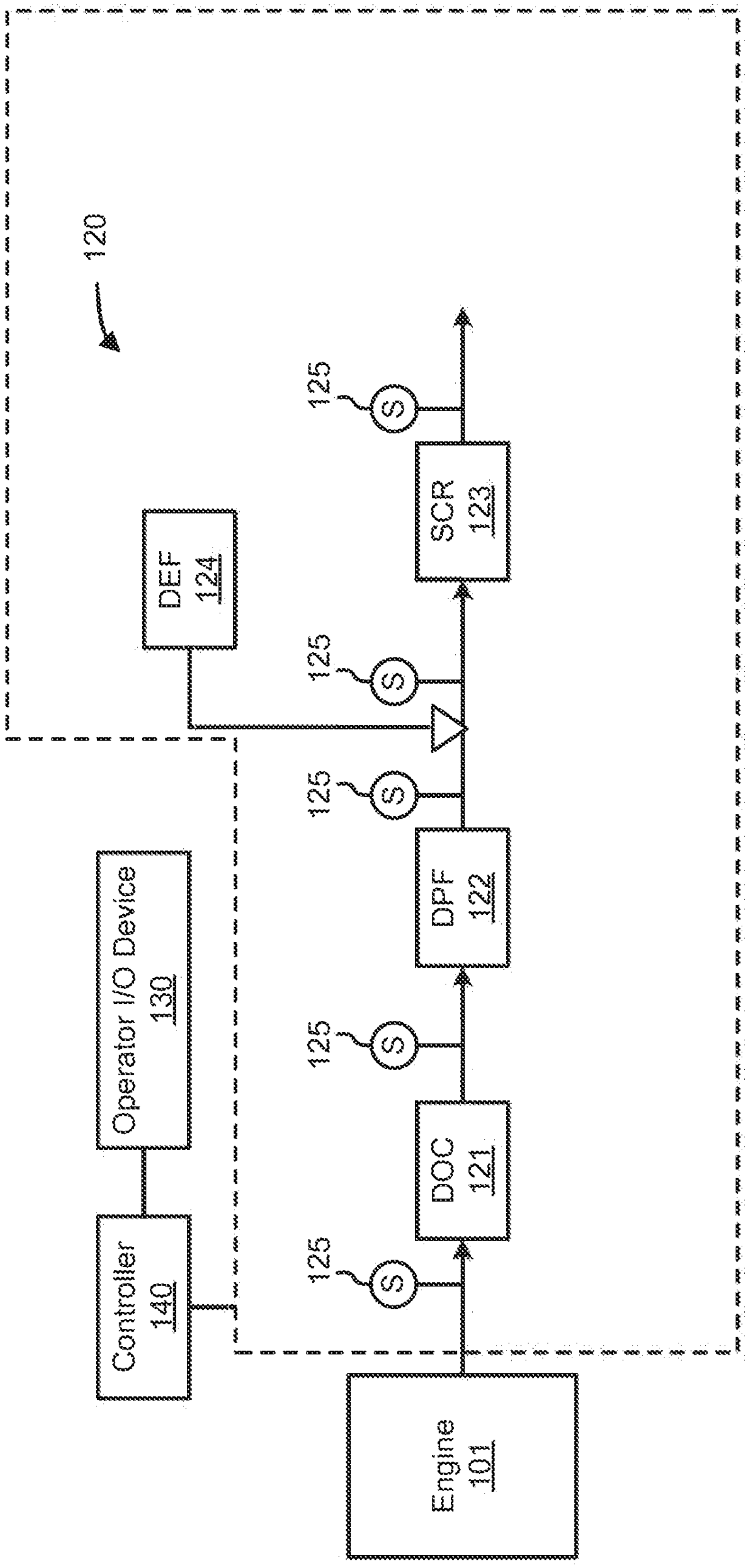
FIG. 3 is a schematic view of a block diagram of the aftertreatment system of the vehicle of FIG. 1, according to an example embodiment.

In some embodiments, the vehicle may include an exhaust aftertreatment system. In this regard and referring now to FIGS. 1 and 3 more particularly, an exhaust aftertreatment system 120 for the vehicle 100 is shown, according to an example embodiment. It should be understood that the schematic depicted in FIG. 3 is but one implementation of an engine exhaust aftertreatment system. Accordingly, it should be understood that the systems and methods of the present disclosure may be used in a variety configurations such that the embodiment depicted in FIG. 3 is not meant to be limiting.

The aftertreatment system 120 is coupled to the engine 101, and is structured to treat exhaust gases from the engine 101 in order to reduce the emissions of harmful or potentially harmful elements (e.g., NOx emissions, particulate matter, etc.). The aftertreatment system 120 is shown to include various components and systems, such as a diesel oxidation catalyst (DOC) 121, a diesel particulate filter (DPF) 122, and a selective catalytic reduction (SCR) system 123. The SCR 123 converts nitrogen oxides present in the exhaust gases produced by the engine 101 into diatomic nitrogen and water through oxidation within a catalyst. The DPF 122 is configured to remove particulate matter, such as soot, from exhaust gas flowing in the exhaust gas conduit system. In some implementations, the DPF 122 may be omitted. Also, the spatial and relative order of the catalyst elements may be different in other configurations.

The SCR catalyst operation can be affected by several factors. For example, the effectiveness of the SCR catalyst to reduce the NOx in the exhaust gas can be affected by the operating temperature. If the temperature of the SCR catalyst is below a threshold value or range, the effectiveness of the SCR catalyst in reducing NOx may be reduced below a desired threshold level, thereby increasing the risk of high NOx emissions into the environment. The SCR catalyst temperature can be below the threshold temperature under several conditions, such as, for example, during and immediately after engine startup, during cold environmental conditions, etc. Further, typically, higher combustion temperatures promote engine out NOx (EONOx) production. This is due to the rapid fire expansion from within the cylinder, which leads to the release of NOx. Increasing exhaust gas recirculation (EGR) leads to reduction in combustion temperatures, which reduces EONOx. However, EGR can promote particulate matter emissions due to incomplete combustion of particles. Additionally, higher loads and power demands also tend to increase combustion temperatures and, in turn, EONOx. Higher power output coincides with higher fueling pressures and quantity (increases in fuel rail pressure). In turn, increasing fueling pressures, quantity, etc. also tends to promote EONOx production.

The aftertreatment system 120 may include a reductant delivery system which may utilize a decomposition chamber (e.g., decomposition reactor, reactor pipe, decomposition tube, reactor tube, etc.) to convert the reductant (e.g., urea, diesel exhaust fluid (DEF), Adblue®, a urea water solution (UWS), an aqueous urea solution, etc.) into ammonia. Reductant 124 is added to the exhaust gas stream to aid in the catalytic reduction. The reductant may be injected by an injector upstream of the SCR catalyst member such that the SCR catalyst member receives a mixture of the reductant and exhaust gas. The reductant droplets undergo the processes of evaporation, thermolysis, and hydrolysis to form non-NOx emissions (e.g., gaseous ammonia, etc.) within the decomposition chamber, the SCR catalyst member, and/or the exhaust gas conduit system, which leaves the aftertreatment system 120. The aftertreatment system 120 may further include an oxidation catalyst (e.g., the DOC 121) fluidly coupled to the exhaust gas conduit system to oxidize hydrocarbons and carbon monoxide in the exhaust gas. In order to properly assist in this reduction, the DOC 121 may be required to be at a certain operating temperature. In some embodiments, this certain operating temperature is between approximately 200 degrees C. and 500 degrees C. In other embodiments, the certain operating temperature is the temperature at which the conversion efficiency of the DOC 121 exceeds a predefined threshold value.

The aftertreatment system 120 may further include a Lean NOx Trap (LNT) and/or a three-way catalyst (TWC) (or another catalytic converter). The LNT may act to reduce NOx emissions from a lean burn internal combustion engine by means of adsorption. Among other potential functions and features, the TWC may function to manage emissions from rich-burn engines while providing optimal performance with minimal cleaning or maintenance. Utilizing a flow-through substrate coated with a precious metal catalyst, the chemical oxidation process may convert engine out emissions into harmless nitrogen, carbon dioxide and water vapor as the gas passes through the catalytic converter (e.g., three-way catalyst).

As shown, a plurality of sensors 125 are included in the aftertreatment system 120. The number, placement, and type of sensors included in the aftertreatment system 120 is shown for example purposes only. In other configurations, the number, placement, and type of sensors may differ. The sensors 125 may be NOx sensors, temperature sensors, particulate matter (PM) sensors, and/or other emissions-related sensors. The NOx sensors are structured to acquire data indicative of a NOx amount at each location that the NOx sensor is located (e.g., a concentration amount, such as parts per million). The NOx sensor may also measure or acquire data indicative of an oxygen concentration in the exhaust gas flowing by the sensor. The temperature sensors are structured to acquire data indicative of a temperature at their locations. The PM sensors are structured to monitor particulate matter flowing through the aftertreatment system 120.

The sensors 125 may be located after the engine 101 and before the aftertreatment system 120, after the aftertreatment system 120, and/or within the aftertreatment system (e.g., coupled to the DPF and/or DOC, coupled to the SCR, etc.). It should be understood that the location of the sensors may vary in other configurations. In one embodiment, there may be sensors 125 may located both before and after the aftertreatment system 120. In one embodiment, the sensors are structured as exhaust gas constituent sensors (e.g., CO, NOx, PM, SOx, etc. sensors). In another embodiment, the sensors 125 are structured as non-exhaust gas constituent sensors that are used to estimate exhaust gas emissions (e.g., temperature, flow rate, etc.).

Additional sensors may be also included with the vehicle 100. The sensors may include engine-related sensors (e.g., torque sensors, speed sensors, pressure sensors, flow rate sensors, temperature sensors, etc.). The sensors may further include motor generator-related sensors (e.g., a battery state of charge (SOC) sensor, a power output sensor, a voltage sensor, a current sensor, etc.). The additional sensors may still further include sensors associated with other components of the vehicle (e.g., speed sensor of a turbo charger, fuel quantity and injection rate sensor, fuel rail pressure sensor, etc.).

The sensors may be real or virtual (i.e., a non-physical sensor that is structured as program logic in the controller 140 that makes various estimations or determinations based on received data). For example, an engine speed sensor may be a real or virtual sensor arranged to measure or otherwise acquire data, values, or information indicative of a speed of the engine 101 (typically expressed in revolutions-per-minute). The sensor is coupled to the engine (when structured as a real sensor), and is structured to send a signal to the controller 150 indicative of the speed of the engine 101. When structured as a virtual sensor, at least one input may be used by the controller 150 in an algorithm, model, look-up table, etc. to determine or estimate a parameter of the engine (e.g., power output, etc.). The other sensors may be real or virtual as well. As described herein, the sensors 125 and additional sensors may provide data regarding how the particular vehicle system is operating, and determine how to adjust operating points of the engine and/or motor/generator based on the sensor feedback.

Referring still to FIGS. 1-3, an operator input/output (I/O) device 130 is also shown. The operator I/O device 130 may be coupled to the controller 140, such that information may be exchanged between the controller 140 and the I/O device 130, where the information may relate to one or more components of FIG. 1 or determinations (described below) of the controller 140. The operator I/O device 130 enables an operator of the vehicle 100 to communicate with the controller 140 and one or more components of the vehicle 100 of FIG. 1. For example, the operator input/output device 130 may include, but is not limited to, an interactive display, a touchscreen device, one or more buttons and switches, voice command receivers, etc. In various alternate embodiments as described above, the controller 140 and components described herein may be implemented with non-vehicular applications (e.g., a power generator with an electric motor). Accordingly, the I/O device may be specific to those applications. For example, in those instances, the I/O device may include a laptop computer, a tablet computer, a desktop computer, a phone, a watch, a personal digital assistant, etc. Via the operator I/O device, the controller 140 may provide diagnostic information, a fault or service notification based on one or more determinations. For example, in some embodiments, the controller 140 may display, via the operator I/O device, a temperature of the DOC 121, a temperature of the engine 101 and the exhaust gas, and various other information. In some embodiments, a failure mode identification may rely on the machine learning techniques and prior training data; however, for a scenario that is new to the algorithm, a powertrain performance circuit, as will be described further herein, may display the images generated by the cameras to the driver via the operator I/O device to determine next steps. For instance, the powertrain camera 206 may display images of the powertrain components that are corroding or weakening due to wear (e.g., due to the upcoming end of life of the component, malfunction, misalignment, etc.) and allow the user to observe the component otherwise not easily accessible. The user may then decide to investigate further, schedule vehicle service, and/or transmit the image over a network to a remote operator, for example. The user may alternatively choose to clear the image/warning.

The controller 140 is structured to control, at least partly, the operation of the vehicle 100 and associated sub-systems, such as the powertrain system 110, camera system 200, the aftertreatment system 120 (and various components of each system), and so on. Accordingly, the controller 140 is coupled to the engine and the electric motor, and a variety of other components, as described above including the road camera 202, the powertrain infrared camera 204, and the powertrain camera 206. According to the example shown, the components of FIG. 1 are embodied in a vehicle. In various alternate embodiments, as described above, the controller 140 may be used with other systems, such as an engine system, an engine-exhaust aftertreatment system with an electric motor (e.g., a power generator with an electric motor), etc. Communication between and among the components may be via any number of wired or wireless connections. For example, a wired connection may include a serial cable, a fiber optic cable, a CAT5 cable, or any other form of wired connection. In comparison, a wireless connection may include the Internet, Wi-Fi, cellular, radio, etc. In one embodiment, a controller area network (CAN) bus provides the exchange of signals, information, and/or data. The CAN bus includes any number of wired and wireless connections. Because the controller 140 is communicably coupled to the systems and components of FIG. 1, the controller 140 is structured to receive data from one or more of the components shown in FIG. 1. The structure and function of the controller 140 is further described in regard to FIG. 4.

Figure 4:
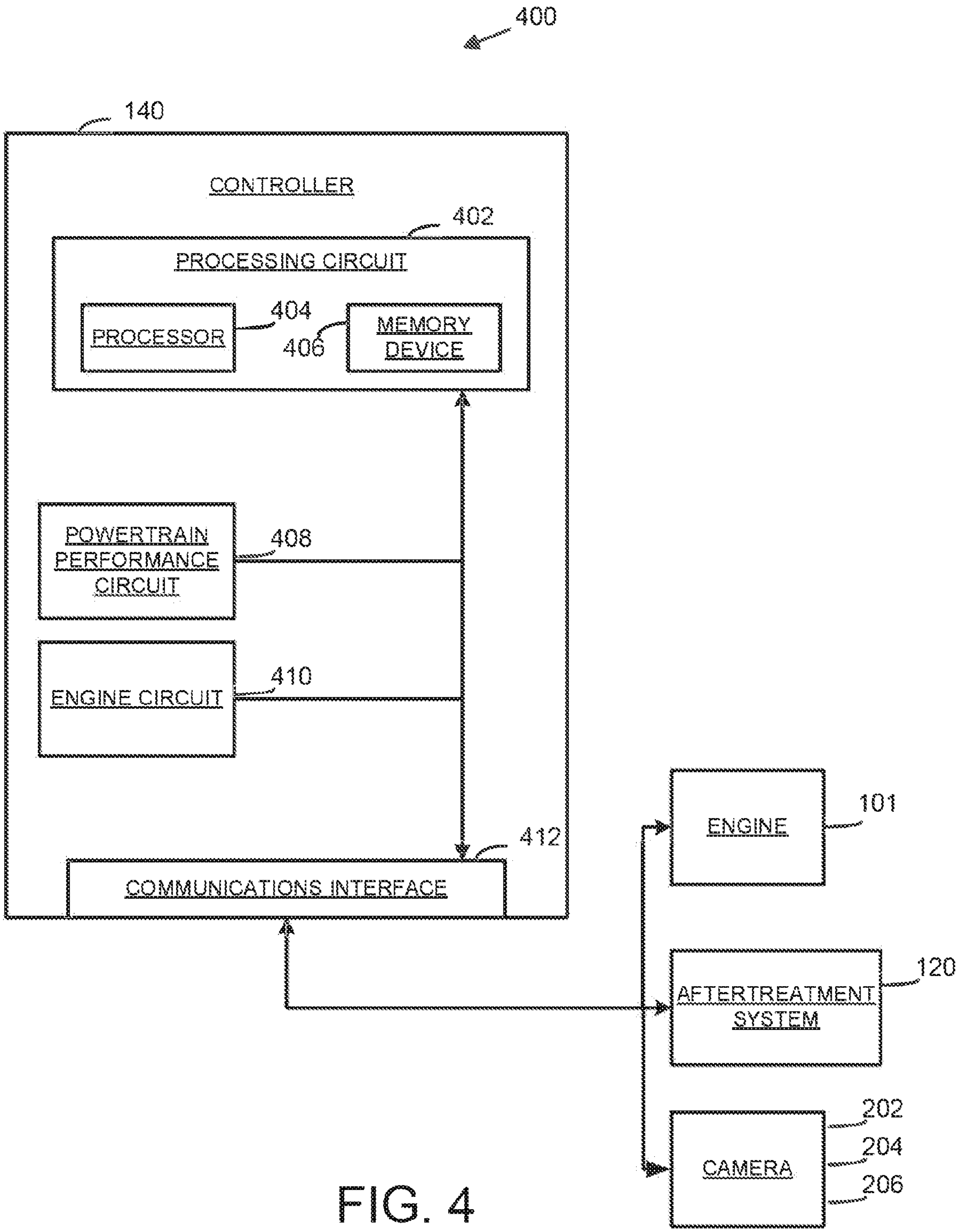
FIG. 4 is a block diagram of the controller of FIGS. 1-3, according to an example embodiment.

Referring now to FIG. 4, a schematic diagram 400 of the controller 140 of the vehicle 100 of FIG. 1 is shown according to an example embodiment. The controller 140 may be structured as one or more electronic control units (ECU). The controller 140 may be separate from or included with at least one of a transmission control unit, an exhaust aftertreatment control unit, a powertrain control module, an engine control module, etc. In one embodiment, the components of the controller 140 are combined into a single unit. In another embodiment, one or more of the components may be geographically dispersed throughout the system. All such variations are intended to fall within the scope of the disclosure. The controller 140 is shown to include a processing circuit 402 having a processor 404 and a memory device 406, a powertrain performance circuit 408, an engine circuit 410, and a communications interface 412.

In one configuration, the powertrain performance circuit 408 and the engine circuit 410 are embodied as machine or computer-readable media storing instructions that are executable by a processor, such as processor 404. As described herein and amongst other uses, the instructions of the machine-readable media facilitates performance of certain operations to enable reception and transmission of data. For example, the machine-readable media may provide an instruction (e.g., command, etc.) to, e.g., acquire data. In this regard, the machine-readable media may include programmable logic that defines the frequency of acquisition of the data (or, transmission of the data). As described herein, the computer readable media may include or store code, which may be written in any programming language including, but not limited to, Java or the like and any conventional procedural programming languages, such as the "C" programming language or similar programming languages. The computer readable program code may be executed on one processor or multiple remote processors. In the latter scenario, the remote processors may be connected to each other through any type of network (e.g., CAN bus, etc.).

In another configuration, the powertrain performance circuit 408 and the engine circuit 410 are embodied as hardware units, such as electronic control units. As such, the powertrain performance circuit 408 and the engine circuit 410 may be embodied as one or more circuitry components including, but not limited to, processing circuitry, network interfaces, peripheral devices, input devices, output devices, sensors, etc. In some embodiments, the powertrain performance circuit 408 and the engine circuit 410 may take the form of one or more analog circuits, electronic circuits (e.g., integrated circuits (IC), discrete circuits, system on a chip (SOCs) circuits, microcontrollers, etc.), telecommunication circuits, hybrid circuits, and any other type of "circuit." For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on). The powertrain performance circuit 408 and the engine circuit 410 may also include programmable hardware devices such as field programmable gate arrays, programmable array logic, programmable logic devices or the like. The powertrain performance circuit 408 and the engine circuit 410 may include one or more memory devices for storing instructions that are executable by the processor(s) of the powertrain performance circuit 408 and the engine circuit 410. The one or more memory devices and processor(s) may have the same definition as provided below with respect to the memory device 406 and processor 404. In some hardware unit configurations and as described above, the powertrain performance circuit 408 and the engine circuit 410 may be geographically dispersed throughout separate locations in the system. Alternatively and as shown, the powertrain performance circuit 408 and the engine circuit 410 may be embodied in or within a single unit/housing, which is shown as the controller 140.

In the example shown, the controller 140 includes the processing circuit 402 having the processor 404 and the memory device 406. The processing circuit 402 may be structured or configured to execute or implement the instructions, commands, and/or control processes described herein with respect to the powertrain performance circuit 408 and the engine circuit 410. The depicted configuration represents the powertrain performance circuit and the engine circuit 410 as instructions such that they may be stored and executed by the memory device 406. However, as mentioned above, this illustration is not meant to be limiting as the present disclosure contemplates other embodiments where the powertrain performance circuit 408 and the engine circuit 410, or at least one circuit of the circuits the powertrain performance circuit 408 and the engine circuit 410, is configured as a hardware unit. All such combinations and variations are intended to fall within the scope of the present disclosure.

The processor 404 may be implemented as one or more processors, an application specific integrated circuit (ASIC), one or more field programmable gate arrays (FPGAs), a digital signal processor (DSP), or other suitable electronic processing components. In some embodiments, the one or more processors may be shared by multiple circuits (e.g., the powertrain performance circuit 408 and the engine circuit 410 may comprise or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. All such variations are intended to fall within the scope of the present disclosure.

The memory device 406 (e.g., memory, memory unit, storage device) may include one or more devices (e.g., RAM, ROM, Flash memory, hard disk storage) for storing data, logic, instructions, and/or computer code for completing or facilitating the various processes, layers and modules described in the present disclosure. The memory device 406 may be communicably connected to the processor 404 to provide computer code or instructions to the processor 404 for executing at least some of the processes described herein. Moreover, the memory device 406 may be or include tangible, non-transient volatile memory or non-volatile memory. Accordingly, the memory device 406 may include database components, object code components, script components, or any other type of information structure for supporting the various activities and information structures described herein.

The communications interface 412 may include any combination of wired and/or wireless interfaces (e.g., jacks, antennas, transmitters, receivers, transceivers, wire terminals) for conducting data communications with various systems, devices, or networks structured to enable in-vehicle communications (e.g., between and among the components of the vehicle) and, in some embodiments, out-of-vehicle communications (e.g., with a remote server). For example and regarding out-of-vehicle/system communications, the communications interface 412 may include an Ethernet card and port for sending and receiving data via an Ethernet-based communications network and/or a Wi-Fi transceiver for communicating via a wireless communications network. In some embodiments, a telematics device may be included with the vehicle 100 that enables out-of-vehicle communications. The communications interface 412 may be structured to communicate via local area networks or wide area networks (e.g., the Internet) and may use a variety of communications protocols (e.g., IP, LON, Bluetooth, ZigBee, radio, cellular, near field communication).

The communications interface 412 may facilitate communication between and among the controller 140 and one or more components of the vehicle 100 (e.g., the engine 101, the transmission 102, the aftertreatment system 120, the sensors 125, the cameras 202, 204, 206, etc.). Communication between and among the controller 140 and the components of the vehicle 100 may be via any number of wired or wireless connections (e.g., any standard under IEEE). For example, a wired connection may include a serial cable, a fiber optic cable, a CAT5 cable, or any other form of wired connection. In comparison, a wireless connection may include the Internet, Wi-Fi, cellular, Bluetooth, ZigBee, radio, etc. In one embodiment, a controller area network (CAN) bus provides the exchange of signals, information, and/or data. The CAN bus can include any number of wired and wireless connections that provide the exchange of signals, information, and/or data. The CAN bus may include a local area network (LAN), or a wide area network (WAN), or the connection may be made to an external computer (for example, through the Internet using an Internet Service Provider).

The powertrain performance circuit 408 is structured to determine one or more control parameters for the powertrain based on the images captured by the road camera 202, the powertrain infrared camera 204, and/or the powertrain camera 206. Based on this determination, a change in operation of the powertrain is commanded, such as in at least one of the electric motor and engine occurs via the engine circuit 410. In operation, the powertrain performance circuit 408 is structured to receive data or information from one or more cameras of the camera system 200. In certain embodiments and dependent upon the analysis of the acquired images from the camera(s), the powertrain performance circuit 408 is structured to generate and provide or send a signal (e.g., OBD codes) to the driver regarding the malfunction detected in the powertrain components, the external components of the vehicle, etc. (i.e., based on the analyzed images corresponding to one or more predefined operating conditions). In some embodiments, the powertrain performance circuit 408 may facilitate reducing or shutting down operation of one or more components as will further be described with reference to the engine circuit 410. Additionally, the powertrain performance circuit 408 is structured to utilize the powertrain infrared camera 204 and the powertrain camera 206 to troubleshoot one or more components.

The powertrain performance circuit 408 is structured to determine and, in some instances, predict a power output (e.g., speed and/or torque combination) to improve powertrain performance. The power output may be a power output commanded from one or both of the engine and the motor generator by the controller 140.

As an example, the powertrain performance circuit 408 obtains an image regarding an object in front of the vehicle via the road camera 202. The image is provided to the powertrain performance circuit 408. The powertrain performance circuit 408 analyzes the image to identify a category and a distance of the object in front of the vehicle. Alternatively, the image processing system 207 may analyze the image. In either situation and as an example of the image analysis, the powertrain performance circuit 408 may isolate the object based on clustering similar-type pixels together and then identify a size of the object based on the number of pixels. Using Equation (1) as an example, then, the powertrain performance circuit 408 may determine a distance between the object and the camera.

$$F=(P\times D)/W \tag{1}$$

In Equation (1), F represents the focal length, P represents the width of the image in pixels, and P the width of the object in pixels. F and W may be predetermined (e.g., the width of the object may be predefined by the lens capability of the camera such that this value is a constant). Then, the camera may acquire an image where an analysis of the image obtains the width of the object in pixels (W). Then, the powertrain performance circuit 408 may determine an estimated distance, D, to the object. It should be understood that multiple different ways may be used to determine a distance between the camera and an object, such that this example is for illustrative purposes only.

Further, the powertrain performance circuit 408 may then determine an object type (e.g., another vehicle, a stationary object in front of the vehicle or on the side of the vehicle). For instance, the powertrain performance circuit 408 may compare an image of the object to a stored library of images in the controller 140 including a variety of object types, the powertrain performance circuit 408 may instead send the image to a remote computing system for analysis, a user may define the object type based on the image taken, and/or a combination thereof.

Based on the distance and/or category of object, the powertrain performance circuit 408 is structured to determine or predict the power demand to accommodate the object. The powertrain performance circuit 408 is structured to determine a power demand to control or attempt to control the vehicle 100 in accordance with a predefined operation relative to the detected object. The predefined operation may be based on the detected object and/or characteristics associated with the detected object (e.g., an estimated distance to the detected object).

A first example may be in regard to detected signage by the road camera 202. For example, the road camera 202 may acquire an image regarding a posted speed limit. The powertrain performance circuit 408 can detect an upcoming speed limit based on the image and determine whether the upcoming speed limit is greater than or less than the current speed of the vehicle. In some embodiments, the powertrain performance circuit 408 may utilize a predefined tolerance of the determined posted speed limit (e.g., plus-or-minus a predefined amount, such as five miles-per-hour (MPH), of the posted speed limit). If the speed of the vehicle is greater or less than the speed limit (or, outside of the predefined tolerance amount of the detected speed limit) detected from the speed limit sign, the powertrain performance circuit 408 may generate a command to adjust the power output. In this regard, the powertrain performance circuit 408 may include a predefined desired operational parameter that the vehicle speed is plus-or-minus a predefined amount of a posted speed limit (e.g., to avoid speeding). If the current vehicle speed is outside of this predefined amount, then the powertrain performance circuit 408 may utilize one or more processes, look-up tables, models, etc. that correlates the posted speed limit, the current vehicle speed, and the predefined tolerance amount to a power adjustment to achieve or attempt to achieve a vehicle speed within the predefined tolerance amount of the posted speed limit. For example, the current vehicle speed may be 80 MPH and the speed limit may be 55 MPH with a predefined tolerance amount of +/−5 MPH. Thus, the powertrain performance circuit 408 may determine that an operating parameter of −25 MPH is needed to be within the predefined tolerance of the posted speed limit. In response, the powertrain performance circuit 408 may gradually apply the brakes of the vehicle 100, cause a transmission shift (if an automatic transmission), and/or reduce an engine speed to slow the vehicle 100 until the detected speed of the vehicle 100 is within the posted speed limit plus-or-minus the predefined tolerance amount. Before implementation of these actions, the controller 140 may provide an indication via the I/O device (e.g., an audible message indicating a change in operation) thereby giving an operator an opportunity to override the change in operation, if desired. In this example, the powertrain performance circuit 408 utilizes feedback controls of the current speed plus slowing the engine speed, applying a brake, and/or a transmission shift until the desired operation parameter is met. In other examples, the powertrain performance circuit 408 may have predefined commands for achieving or likely achieving the desired operating parameter. As an example and with respect to the above example, the −25 MPH desired operating parameter change may correspond with a reduction of fuel injection into the engine by a predefined amount and timing with such information stored in a look-up table in the controller 140 such that constant feedback controls may not be utilized or utilized a relatively lesser amount. Thus, based on the current/initial speed/power output of the vehicle and the captured image, the powertrain performance circuit 408 can determine a required change in power output/speed. As such, the controller 140 can proactively control the fuel system or the air handling system of the internal combustion engine to match or attempt to match/meet the anticipated power increase or decrease, such that the response of the powertrain can be improved.

Another example relates to detecting operating conditions regarding another vehicle relative to the vehicle 100. The powertrain performance circuit 408 can detect another vehicle ahead of (e.g., in front of) the user vehicle 100 based on one or more images via the road camera 202. By capturing several images via the road camera 202, the powertrain performance circuit 408 can determine the speed of the vehicle ahead relative to the current/initial speed of the user vehicle and/or a distance to the vehicle proximate the vehicle 100 (e.g., based on Equation (1)). The powertrain performance circuit 408 can then determine a required change in speed to avoid a collision, for instance. Alternatively, the powertrain performance circuit 408 may monitor a distance between the other vehicle and the vehicle 100 through a series of images and adjust the speed of the vehicle 100 (e.g., transmission shifts, increase/decrease of engine speed, etc.) to maintain a desired distance between the vehicles to, for example, enable a drafting arrangement or a desired separation distance.

Still another example relates to detecting external conditions that may affect a speed of the vehicle 100. For instance, the road camera 202 may detect road signs that indicate one or more of, e.g., a speed limit, a stop, a road curvature, a road grade, a road condition/characteristics (e.g., gravel, smooth, potholes, precipitation, etc.), etc. that may impact the power demand of the vehicle for traversing that section of the route/road at a predefined desired speed. For instance, if a road curvature is determined to be at or above a predefined threshold, the controller 140 may determine that the vehicle will likely need to slow down before that curve. The powertrain performance circuit 408 may send a command regarding the need for the slow down to the engine circuit 410 to slow the vehicle, which may additionally consider additional look-ahead information to determine upcoming power requirements for the vehicle, such that the road camera 202 detects the real time conditions and compares or combines the two data points to estimate what is coming up in front of the vehicle with respect to how it might impact the demand of the powertrain. For instance, the processed image data may be combined with GPS data and other look ahead data to confirm or deny various situations/conditions or otherwise affect the powertrain control for more refinement. In response to determining or predicting the needs of the powertrain (e.g., the power demand), how the power is delivered may be adjusted as described herein (e.g., increase engine output, increase electric motor power output, gear shifting, etc.). The determined power delivery can be both from an efficiency standpoint as well as from a timeliness standpoint. For instance, the vehicle can be adjusted to deliver power faster or to deliver that power more efficiently. Particularly, engine controls around positioning the fuel system or the air-handling system can be adjusted to provide the power as needed.

In addition to speed controls, the controller 140 can control the thermal management of the aftertreatment system based on feedback from the camera system 200. As an example, the controller 140 may control thermal management of the aftertreatment system according to the anticipated power increase or decrease. For example, an infrared camera 204 may be disposed in the aftertreatment system proximate the SCR 123. The camera may obtain images regarding a heat gradient across the SCR catalyst indicating that the catalyst is relatively hotter upstream compared to downstream. Based on this information, the controller 140 may activate a heater (e.g., an electric aftertreatment system heater) to heat the SCR 123 and, particularly, the rear portion of the catalyst. In some embodiments, the controller 140 may utilize information from one or more temperature sensors to at least one of verify the thermal images analyses or train the processing circuit of the controller 140. For example, a temperature sensor may indicate that the rear of the catalyst of the SCR is relatively cooler than a temperature sensor reading regarding a front of the SCR catalyst of the SCR. Thus, the controller 140 may verify the determination of the thermal image. Additionally, the thermal image may not provide an indication of an approximate temperature. In this case, the temperature sensors may inform the approximate temperatures for the objects in the thermal image. For example, a temperature sensor disposed upstream of the SCR catalyst may be used to approximate a temperature upstream of the SCR catalyst while a temperature sensor downstream of the SCR catalyst may be used to determine a temperature downstream of the SCR catalyst. These temperatures may correspond with different infrared signatures. The camera 204 may obtain a thermal image of the middle portion of the SCR catalyst and using a correlation of infrared signature to approximate temperature, the controller 140 may estimate an approximate temperature of the middle portion of the SCR catalyst based on its thermal gradient coloring relative to the temperature/gradient coloring for the upstream and downstream SCR catalyst portions. In other words, the controller 140 may utilize the temperature/gradient color combination for the upstream and downstream portions (two data points) to generate a relationship (e.g., formula) used to estimate approximate temperatures throughout the system where a temperature sensor may not be disposed by the camera is able to obtain images. In another embodiment, the temperature/gradient combinations may be predetermined by experimental data and stored in the controller 140 for quick retrieval such that the controller 140 may readily estimate a temperature of an object based on its thermal signature without generating a relationship to estimate the temperature. In either situation, the controller 140 may command thermal management for the aftertreatment system 120 based on at least one temperature estimate or image (e.g., increase power output to increase exhaust gas temperatures, command post hydrocarbon dosing, activate one or more aftertreatment system heaters, etc.).

In some embodiments, the thermal image may be correlated with one or more hydrogen ($H_2$) sensor readings regarding at least one of an internal or an external condition of the vehicle (e.g., within the vehicle and/or external of the vehicle). This correlation(s) may be used to indicate a level of risk for a vehicle or component thereof. Specifically, the data from the hydrogen sensor(s) may be tracked to identify/determine an amount of hydrogen in an area. Additionally, thermal image data from one or more infrared cameras 204 may then identify/determine an approximate heat or temperature value in various regions. Thus, the heat and hydrogen values from the thermal camera(s) and hydrogen sensor(s) for positions internal and/or external of the vehicle may be tracked. If the combined/correlated values (i.e., a hydrogen sensor reading or an average reading over a predefined amount of time and information from one or more thermal images that may indicate a heat/temperature value based on an analysis of the heat signature from the image(s)) of the hydrogen sensor and thermal image are above a first threshold indicative of a likelihood of combustion or flammability of the hydrogen given the thermal presence, a first risk level may be established/determined for the vehicle by the controller 140. Based on the first risk level, the vehicle may implement an adjustment for the vehicle that addresses the first risk level (e.g., a warning notification via the I/O device, to a remote operator, etc.). If the combined/correlated values of the hydrogen sensor and thermal image are above a second threshold that is indicative of a greater combustibility risk, a second risk level may be established/determined for the vehicle by the controller 140. Based on the second risk level, the vehicle may implement an adjustment for the vehicle or a component thereof, such as one or more of running a fan to cool a vehicle component (or causing a notification for an operator to turn a fan on in an engine bay), cause coolant through the vehicle system where the highest temperatures are located, cease use of hydrogen fuel (if being utilized by the engine), etc. In addition to the above, these correlations may be utilized in more sensitive applications like marine application (e.g., Safety of Life at Sea) or other regulatory applications with stricter limits. In some embodiments, the correlation tracking is only performed by the controller 140 in response to one or more hydrogen sensors sniffing/receiving data indicative of a hydrogen amount in the vehicle above a predefined threshold. Because of the flammability of hydrogen, tracking hydrogen content in and/or around the vehicle may be important to reduce undesired combustion. If the hydrogen content satisfies the threshold, the controller 140 may track thermal data from the thermal camera for a predefined period of time to determine the heat and hydrogen content for an area or areas within or around the vehicle. By selectively implementing this correlation process, the controller 140 may conserve computing resources.

In some embodiments, the thermal cameras may be used to detect an overall temperature regarding the vehicle. In particular, the thermal camera(s) with the controller 140 may detect, receive data indicative of, and/or otherwise determine an increase or a decrease in a vehicle system (e.g., for an extended period of time beyond a threshold level that may increase a potential for thermal degradation of that system). In some embodiments, the overall temperature may refer to an average temperature (or another temperature metric, such as a median value, etc.) of one or more average temperatures (or another temperature metric) taken at various places within the vehicle system (e.g., an engine cavity temperature, an aftertreatment system temperature, etc.) over a predefined period of time. The overall temperature may indicate the degradation of one or more components of the vehicle system. Specifically, if the overall temperature of the vehicle system increases at a certain rate above a certain predefined rate threshold, this temperature increase may indicate a degradation or a potential degradation of a vehicle component(s). For example, thermal cameras may be used to detect that the overall temperature in an engine bay is above a certain threshold for a certain time period, which may indicate degradation or a likelihood of degradation within the engine bay. As another example, if the overall temperature within an engine rises above a certain threshold within a certain amount of time, this profile may indicate degradation or a potential for degradation of the piston rings.

With respect to a hybrid vehicle, a power split between the electric machine and internal combustion engine can be controlled by the controller 140 according to the anticipated power increase or decrease (made via the powertrain performance circuit 408), such that the fuel consumption can be reduced. For instance, the controller 140 may command the power output from the electric machine to increase to compensate for the determined upcoming speed increase while maintaining or decreasing the output from the engine in order to attempt to achieve a desired fuel efficiency. Alternatively, the controller 140 may determine that the state of charge (SOC) of the battery is below a predetermined threshold relative to a predetermined power threshold associated with a power output from the electric machine to meet or substantially meet the increase in power demanded and, in turn, command additional power output from the engine in lieu of the electric machine.

Additionally, predictive cooling and predictive thermal management for both the aftertreatment system as well as other cooling devices will allow those systems to prepare for either an upcoming demand or a lower power demand state. For instance, the powertrain performance circuit 408 may use the thermal imaging to detect a high temperature thermal event of a component or area, such as one or more battery packs of the vehicle overheating or potentially overheating (based on detected temperatures above a predefined threshold temperature). Detrimentally, if the hot spots have become too hot, the reaction may not be able to be stopped, which is known as a thermal runaway event and can lead to combustion and significant failure. The powertrain performance circuit 408 can monitor hotspots in the battery pack(s) and isolate suspected areas/sections of battery pack. Particularly, in one embodiment, if the infrared camera 204 detects the battery packs are overheating, the controller 140 can prioritize use of the engine to achieve the desired power output when the battery is not functioning properly. In other words, if multiple power producing devices are coupled to the vehicle, the power may be adjusted to be split between those power producing devices such as an internal combustion engine and an electric machine. Additionally or alternatively, predictive gear shifting may be utilized along with the information of an upcoming steep uphill, for instance, to adjust the operation of the engine and down shift to get access to more power or the power demand of the vehicle speed can assist in determining gear shifting decisions. In the instance where the determined temperature is associated with a thermal runaway event (e.g., a temperature above a high temperature threshold), in one embodiment, the controller 140 is structured to shut the battery pack(s) off to prevent or attempt to prevent the thermal runaway event (at least slow or mitigate it). In another embodiment, the controller 140 is structured to delay cutting or shutting off the power from the battery pack(s) (i.e., not cut power entirely from the powertrain when a full electric vehicle) to provide an operator with time to pull the vehicle over or take another action without full powertrain disablement. For example, the controller 140 may be structured to provide an alert to the operator of an impending shutdown to the I/O device 130 (e.g., a message that may indicate the impending shutdown due to the detected potential thermal runaway event) and then implement a shutdown (e.g., cut power from the battery pack(s) or otherwise disable the powertrain) after a predefined amount of time (i.e., a staged shutdown). Alternatively, the staged shut down may be associated with a progressively decreasing power output availability from the battery pack(s) after detecting the thermal runaway event (e.g., eighty-percent for one minute followed by sixty-percent for one-minute and so on until the power is cut from the battery pack(s) and the powertrain disabled).

The powertrain performance circuit 408 is also structured to identify a road condition to improve powertrain performance by, for example, reducing fuel consumption, improving drivability (e.g., reducing shifting), and so on. For instance, the road camera 202 can acquire one or more images to identify a weather condition, a type of road surface (e.g., gravel, asphalt, etc.), and so on. For example, the road camera 202 may acquire an image regarding the presence of wetness or rain external to the vehicle 100. In response, the controller 140 may activate an operating mode for the vehicle to reduce a likelihood of slippage (e.g., all-wheel drive, etc.), may activate a windshield wiper, and so on. As another example, the road camera 202 may acquire an image indicating a relatively unstable driving surface as compared to a paved road (e.g., a gravel road environment). In response, the controller 140 may activate an operating mode to prevent or substantially prevent slippage (e.g., all-wheel drive, etc.), adjust a suspension of the vehicle 100 to accommodate an uneven driving surface, shift to a transmission setting that may provide lower torque output to facilitate better traction (e.g., shift to a relatively lower transmission setting), and so on.

In operation, the powertrain performance circuit 408 can utilize multiple cameras (e.g., multiple road cameras 202) to determine internal and/or external conditions for the vehicle 100. For example, the powertrain performance circuit 408 may utilize multiple road cameras 202 to estimate a road grade ahead of the vehicle 100 to improve the power prediction accuracy. For example, a first road grade camera 202 may have a relatively shorter image-capture length (e.g., twenty-five feet) whereas a second road camera 202 has a relatively further image-capture length (e.g., two-hundred feet). Based on one or more images from each of these cameras, a grade a relatively short distance and long distance in front of the vehicle 100 may be estimated by the powertrain performance circuit 408. With this information, the powertrain performance circuit 408 can estimate a power output to traverse this grade at a desired speed (which may be predefined or automatically defined based on detected signage, such as the predefined speed may be the speed limit which is determined by an image from the camera 202). Further, with these images, the powertrain performance circuit 408 may estimate a rolling coefficient of the road at each determined road grade portion to improve the power prediction accuracy. As an example, if the road camera 202 detects a first uphill portion and a second uphill portion greater than the first uphill portion (based on images from the two cameras), the controller 140 may increase the power output from the engine during the first uphill portion to X horsepower (HP) to go above the predefined desired speed by an allowed predefined amount and then command an electric machine to provide a power output during the second uphill portion so that the engine remains at a power output of X (HP) throughout the first and second uphill portions. This may result in increased fuel savings due to an otherwise required increase in engine power output during the second uphill portion. As another example, the controller 140 may implement an upshift during the first uphill portion above a typical transmission setting for traversing the first uphill portion at the desired speed in order to avoid a transmission shift event during the second uphill portion. This may improve drivability for the vehicle 100.

The powertrain performance circuit 408 is also structured to improve powertrain diagnostics and prognostics based on received camera information. Particularly and in one example, the powertrain performance circuit 408 can utilize the powertrain infrared camera 204 to detect an abnormality in one or more powertrain components (i.e., a predefined condition). For instance, the powertrain performance circuit 408 via the powertrain infrared camera 204 may detect leaking or insulation degradation in or between one or more of the powertrain components. Particularly, if coolant is leaking within the vehicle 100, the powertrain infrared camera 204 may detect a temperature variant at a location within the vehicle 100 (e.g., a cooler temperature at the point of leak, or a higher temperature in the components downstream that are not properly being cooled). Further, temperature variants may be detected via the infrared camera 204 within the system which indicate insulation degradation (e.g., a spike or drop in temperature at the point of insulation failure or near the surrounding components being exposed to greater heat). Additionally, the powertrain performance circuit 408 via the powertrain infrared camera 204 may detect thermal management malfunction by considering the temperature distribution between the input and output of the thermal management system components. For instance, the infrared camera 204 may take an image indicating the presence of heat at an inlet of a conduit and an image indicating the presence of heat at an outlet of the conduit. The images are then analyzed by the controller 140 (e.g., the controller 140 compares the images to determine whether the change of temperature between the inlet and the outlet is below a predetermined threshold) and the controller 140 determines a malfunction via the infrared camera 204 if the change is below the predetermined threshold (in this case, coolant may not be circulating through the system to make the temperature gradient across the system a desired gradient). In some embodiments, the powertrain performance circuit 408 via the powertrain infrared camera 204 may detect thermal failure of powertrain components by monitoring hot spots (e.g., regarding high voltage wires and junction boxes) for isolation failure or monitoring component (e.g., turbocharger, aftertreatment system, battery modules, etc.) temperature for thermal stress and failure analysis.

As alluded to above, the powertrain performance circuit 408 may use the cameras to detect fluid flow in the vehicle 100 (e.g., air, oil, coolant, etc.). For instance, the infrared camera 204 may acquire images regarding a flow of coolant in the vehicle 100. Based on the images, the powertrain performance circuit 408 detects that one or more areas are not receiving a desired flow of coolant (e.g., localized hot or cool spots, images showing a blockage of coolant flow, etc.). The controller 140 may generate and display an indication regarding the potential issue (e.g., a fault code, a dashboard indicator with a message, etc.).

Regarding moving/rotating parts, the powertrain performance circuit 408 may utilize camera images to diagnose operation of these parts. For example, the powertrain performance circuit 408 may determine one or more of an impending fire, fan failure, high heat build-up, and/or a seizure in rotating parts when the infrared camera 204 detects temperatures above a predefined threshold specific for each of these components. Given the position capability of the cameras, such as the infrared camera 204, the cameras may configured to detect a presence of a flame that may be otherwise invisible to an operator (i.e., an invisible flame). For example, when hydrogen is used as a fuel source (or otherwise used), a hydrogen-based flame may not be visible to the operator but can be detected by the infrared camera 204. In which case, the controller 140 may be structured to shut down the system or parts thereof to mitigate the spread of the detected flame. Similarly, the powertrain performance circuit 408 may use the cameras to perform spark detection. For instance, the powertrain infrared camera 204 may detect electrical or chemical reaction or the powertrain camera 206 may detect a visible spark. In response, the powertrain performance circuit 408 is configured to flag this event when such an event is detected.

As another specific example and with respect to leaks, the powertrain performance circuit 408 may use the powertrain infrared camera 204 to identify/determine a presence of leaking fluid (e.g., hydrogen) and provide targeted fan cooling based on locally-high temperature "hotspots". If hydrogen is determined to be present via the powertrain infrared camera 204, the engine circuit 410 is configured to reverse certain fans to remove the hydrogen. In this regard, the controller 140 may also activate or deactivate certain fan(s) and/or activate certain fan(s) at certain speeds and directions. The activation, direction, and/or speed may be based on the presence of the detected leak. For example, a detected hydrogen leak may be present a front of the engine cavity proximate a fan and a vent. The controller 140 may deactivate other fans nearby and activate the fan to proximate the leak to direct the hydrogen out of the cavity through the vent. By deactivating other area fans, the activated fan may be able to more completely direct the hydrogen out of the cavity. Thus, the controller 140 may direct fluid leaks, such as hydrogen, to appropriate places via coordination with the fans included with the vehicle. If the leak is severe, an alert to evacuate the vehicle may alternatively, or additionally, be generated and provided by the controller 140 to the operation I/O device. Additionally, the controller 140 may transmit a message over a network to a remote attendant to notify them of this potential undesirable circumstance. The remote attendant may then dispatch appropriate personnel to the vehicle. This may be especially important for mine/haul applications wherein operators are on top of haul truck and evacuating from the vehicle is not quick or easy due to the height and size of the vehicle. As another example, if an operator is not near the engine car, they may not be aware of emergency.

Analysis of the images may be performed by at least one of the controller 140 (including the camera image processing circuit 208) or a remote computing system associated with the controller 140 and/or vehicle 100. The remote computing system is a remote computing system relative to the vehicle 100 such as a remote server, a cloud computing system, and the like. In some embodiments, the remote computing system is part of a larger computing system such as a multi-purpose server, or other multi-purpose computing system. In other embodiments, the remote computing system is implemented on a third party computing device operated by a third party service provider (e.g., AWS, Azure, GCP, and/or other third party computing services). The remote computing system is a service and/or system/component provider computing system and in turn controlled by, managed by, or otherwise associated with service and/or system/component provider (e.g., an engine manufacturer for the engine of the vehicle 100, a vehicle manufacturer, a fleet operator, an exhaust aftertreatment system manufacturer, etc.). In the example shown, the remote computing system is operated and managed by an engine manufacturer (which may also manufacture and commercialize other goods and services). Accordingly, an employee or other operator associated with the service and/or system/component provider may operate the remote computing system. The remote computing system may include one or more processing circuits for performing certain operations. Via the communications interface 412, the controller 140 may transmit acquired images from the on-board camera system 200 for analysis by the remote computing system. For instance, image processing and machine learning may be used to identify and classify the various present conditions (i.e., the images may be analyzed to diagnose one or more components), such as smoke detection, mechanical component misalignment, protrusion or foreign objects, and visual damage detection (e.g., cracks, scratches etc.), as described herein. In other embodiments, determined correlations (e.g., thermal gradient coloring-to-estimated temperature information), formulas, processes, etc. may be stored in the memory of the controller 140 for quick retrieval. This latter configuration may be beneficial to avoid utilization of a network connection for implementing the image analysis. Even in this configuration, information acquired by the controller 140 may be periodically transmitted to the remote computing system for refining the control processes/algorithms for the acquired images and general record-tracking.

Regarding remote analysis, the remote computing system may then transmit one or more notifications to at least one of the vehicle 100 or a technician location. For example, the images may be analyzed and a command/prompt provided to the vehicle 100 to direct the vehicle to at least one nearby location. The operation of the vehicle may accept the prompt and select a location via the I/O device. In response, the remote computing system may send the images to the selected location to enable technician analysis. This may save time in troubleshooting the potential problem because the images may be in locations that require significant labor time to access. Thus, the camera images may save labor time. Additionally, the images may be sent by the controller 140 to one or more technicians directly and not via the remote computing system. All such variations are intended to fall within the scope of the disclosure.

In some embodiments, off-vehicle/on-site cameras may additionally be utilized (e.g., traditional cameras, infrared cameras, and/or any other types of cameras). For instance, the vehicle may be a mining vehicle. Off-vehicle cameras may be strategically placed on the mine site that take external measurements of other vehicles passing by, and/or off-vehicle mobile cameras (drones, quadruped robots) that monitor the vehicle during transit, loading, unloading, charging, etc. Such external cameras may be used to identify the present vehicle such that information regarding that present vehicle can by synced with the on-board camera images/information. For instance, the cameras may capture an image of the license plate which is then associated with a particular vehicle (e.g., vehicle 100). Alternatively or additionally, the camera may have a transponder that receives signals from a vehicle. The signals may include a vehicle identifier (e.g., ESN, controller calibration number, etc.), wherein the vehicle identifier is tied to the images taken by the external camera. That way, the external images become synched/linked with the internal camera images/information. For instance, the controller 140 may be configured to sync the external images and the internal images. Alternatively, the remote computing system may have a remote database where the images are sent to be analyzed and synced. In the circumstance with a remote database, the databased may be searched to identify the vehicle associated with the license place. A controller identifier (ID) is then determined based on the determination such that the external images may be transmitted to the controller based on the ID and the internal images may be requested from the controller based on the ID. The remote computing system may then perform an analysis on the sets of images and can store the images (e.g., with a timestamp) to facilitate for tracking progression over time. Data collected from cameras can be used to further tune thresholds (cloud considerations, modeling) to apply to other vehicles or future platforms or model years. The system may also utilize fiber optics to measure sealed, inaccessible, and/or remote component from a convenient centralized location where transducers are located (camera(s), simple IR sensors). The on-boards IR cameras may be installed in a convenient location (e.g., low temperature, vibration, out of the way) and bring the optical information to the cameras with fiber optics. This can significantly reduce complexity and cost of the monitoring system.

The engine circuit 410 is structured to communicate with and control, at least partly, the engine 101 based on feedback from the powertrain performance circuit 408. In particular, the engine circuit 410 is structured to control one or more operating points (speed, torque, etc.) of the engine 101 based on the camera feedback determined by the powertrain performance circuit 408. The engine circuit 410 is structured to transmit a command to designate a desired operating point of the engine 101 (e.g., a target torque and/or speed output) in response to data/information from the cameras 202, 204, 206. The engine circuit 410 may also be structured to control one or more operating points of the electric machine (e.g., current and/or voltage consumption, power output, etc.). The operating point for the engine generally refers to particular operating conditions that may be commanded (e.g., a particular speed and torque output, etc.). The operating point may also include operating points for other components, such as the fueling system (e.g., a fuel injection quantity and timing, etc.), electric machine (as described above, and other systems.

In some embodiments, the engine circuit 410 is structured to apply mitigating measures in response to the powertrain performance circuit 408 using the thermal imaging (e.g., the powertrain infrared camera 204) to detect adverse conditions in one or more components (e.g., fuel cell, battery, etc.). For instance, data collected by the cameras may be used for preventative circumstances (e.g., alerting operator to concerns/issues/emergencies), service scheduling, and/or diagnosing problems and taking mitigating actions. For example, in some embodiments, the engine circuit 410 is structured to shut down a part of the system. For instance, if a temperature spike is sensed (e.g., a temperature above a predefined threshold and/or for more than a predefined amount of time) via the powertrain infrared camera 204 or visible environmental elements are detected via the powertrain camera 206 (e.g., unclean air in a mining application may tend to cause a seizure in rotating machinery such as spinning of the electrically driven cooling pumps, and the seizing may cause a temperature spike), it may be desired to shut down a part (e.g., the pump, engine, etc.) of the system to avoid damage. In certain embodiments, if there are some sections of the battery or there is a predefined number out of a group of packs that is tending to overheat, the controller 140 may turn off just the certain section of the battery pack or just the group of packs, as opposed to shutting the full system down. Thus, the controller 140 may adjust the system operation to draw power elsewhere to compensate. In certain embodiments, the engine circuit 410 may shut the battery down but not shut the coolant pump down (e.g., an e-pump). In such a configuration, the system can keep providing coolant or more coolant by giving that pump more current to be able to provide more cooling, for instance, or what it requires to avoid the risk of fire. In response to a locally high temperature detection, decoupling the engine speed from the cooling capability with electric pumps provides flexibility.

Figure 5:
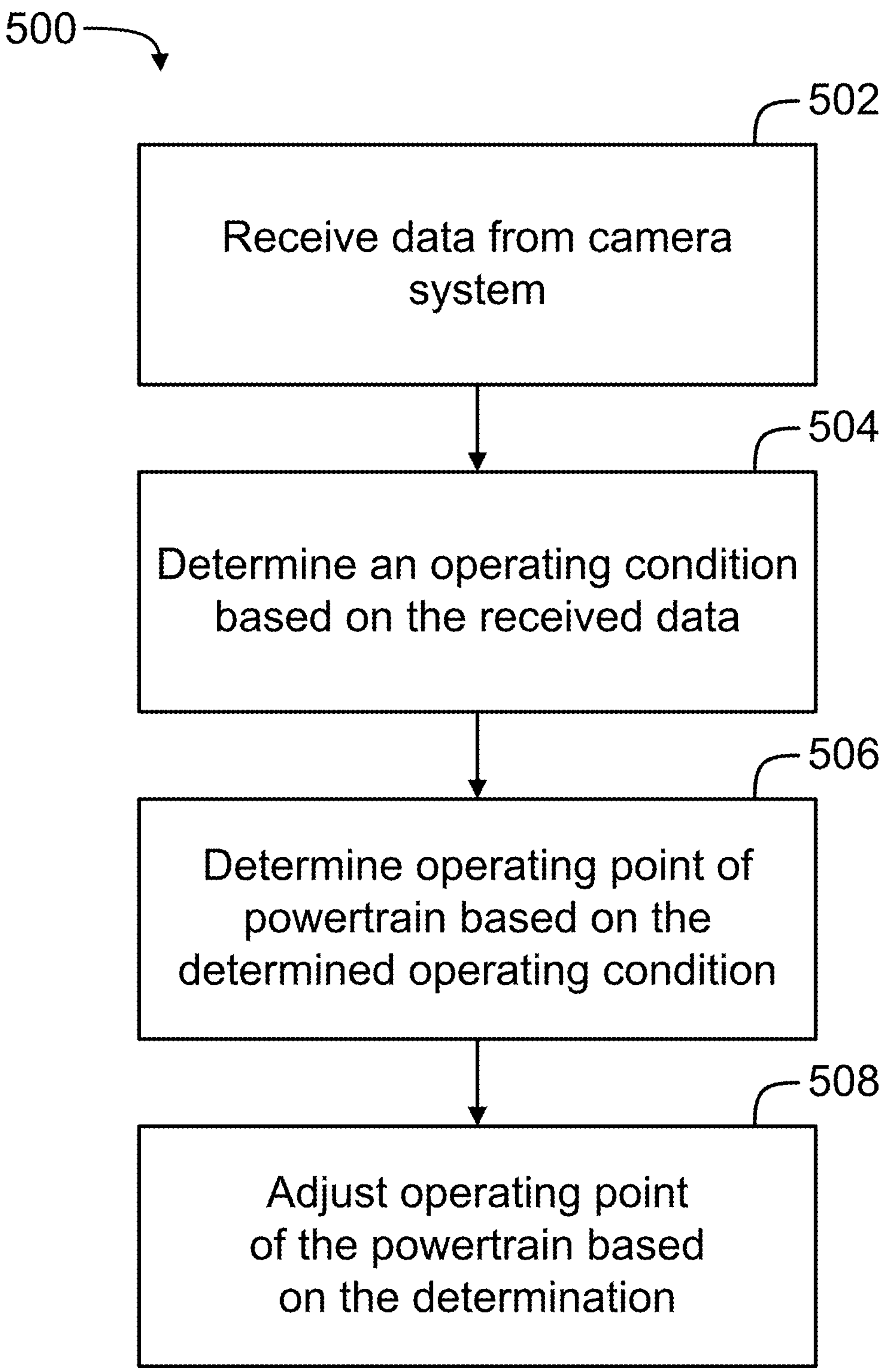
FIG. 5 is a flow chart illustrating a method of operating vehicle with a camera system, according to an example embodiment.

Referring now to FIG. 5, a method 500 of operating a vehicle system is shown, according to an example embodiment. At process 502, a controller 140 of a vehicle 100 receives data from a camera coupled of the vehicle 100. For instance, the camera may be a road camera 202, a powertrain infrared camera 204, and a powertrain camera 206 that provides one or more images to the controller 140. The controller 140 receives data from the camera regarding at least one of an internal or external condition of the vehicle 100 (e.g., internal information may include information regarding operation of the powertrain while external information may include a condition or characteristic of a road). For instance, the road camera 202 may capture images regarding external conditions of the vehicle 100, such as traffic, weather, road, pedestrian, signs, etc. external of the vehicle 100. The powertrain infrared camera 204 may capture images regarding internal operating conditions of the vehicle 100, such as a thermal image of various powertrain components. The powertrain camera 206 may capture a regular image, as opposed to an infrared image, of the various powertrain components 110. At process 504, the controller 140 determines that the received data is indicative of a predefined operating condition. The predefined operating conditions may correspond with the controller 140 take one or more actions, such as adjusting an engine power output, adjusting a vehicle speed, implementing thermal management with the aftertreatment system (e.g., activating a heater), generate a fault code(s) and/or a message, and so on. In contrast, the images may also indicate various internal or external conditions of the vehicle 100 but the controller 140 does not take any actions. As described herein, the operating conditions may be in regard to internal and/or external operating conditions, such as power demands based on posted speed limits, road grade, road curvature; fluid flows within the vehicle 100; detection of hot or cold spots within the vehicle 100; a combination thereof; and, so on. At process 506, the controller 140 determines an operating point of a powertrain 110 of the vehicle system 100 based on the determined operating condition. For instance, in regards to the road camera 202, the data may be indicative of an upcoming speed limit sign. As such, the controller 140 predicts a change in speed necessary to comply or attempt to comply with the speed limit shown in the speed limit sign. In regards to the powertrain infrared camera 204, the data may be indicative of an overheating component and the controller 140 determines to reduce a power output of engine (i.e., an operating point) to allow one or more vehicle 100 components to cool. At process 508, the controller adjusts the operating point of the powertrain 110 based on the determination. Alternatively or additionally, the controller 140 may generate a warning/notice to the user to inform the user of the detection and prediction for the user to determine next steps, such as needed service event for the vehicle 100.

The systems described herein for utilizing on-vehicle cameras to detect, diagnose and/or prevent powertrain components failures, to optimize powertrain performance, and for smarter driver assistance allows for more effective prognostics and diagnostics that reduces warranty cost, and more competitive powertrain products in the market with better safety, drivability and fuel economy.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using one or more separate intervening members, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic. For example, circuit A "coupled" to circuit B may signify that the circuit A communicates directly with circuit B (i.e., no intermediary) or communicates indirectly with circuit B (e.g., through one or more intermediaries).

While circuits with particular functionality is shown in FIG. 4, it should be understood that the controller 140 may include any number of circuits for completing the functions described herein. For example, the activities and functionalities of the powertrain performance circuit 408 and the engine circuit 410 may be combined in multiple circuits or as a single circuit. Additional circuits with additional functionality may also be included. Further, the controller 140 may further control other activity beyond the scope of the present disclosure.

As mentioned above and in one configuration, the "circuits" may be implemented in machine-readable medium storing instructions for execution by various types of processors, such as the processor 404. An identified circuit of executable code may, for instance, comprise one or more physical or logical blocks of computer instructions, which may, for instance, be organized as an object, procedure, or function. Nevertheless, the executables of an identified circuit need not be physically located together, but may comprise disparate instructions stored in different locations which, when joined logically together, comprise the circuit and achieve the stated purpose for the circuit. Indeed, a circuit of computer readable program code may be a single instruction, or many instructions, and may even be distributed over several different code segments, among different programs, and across several memory devices. Similarly, operational data may be identified and illustrated herein within circuits, and may be embodied in any suitable form and organized within any suitable type of data structure. The operational data may be collected as a single data set, or may be distributed over different locations including over different storage devices, and may exist, at least partially, merely as electronic signals on a system or network.

While the term "processor" is briefly defined above, the term "processor" and "processing circuit" are meant to be broadly interpreted. In this regard and as mentioned above, the "processor" may be implemented as one or more processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some embodiments, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., a local computing system, etc.) or remotely (e.g., as part of a remote server such as a cloud based server). To that end, a "circuit" as described herein may include components that are distributed across one or more locations.

Embodiments within the scope of the present disclosure include program products comprising computer or machine-readable media for carrying or having computer or machine-executable instructions or data structures stored thereon. Such machine-readable media can be any available media that can be accessed by a computer. The computer readable medium may be a tangible computer readable storage medium storing the computer readable program code. The computer readable storage medium may be, for example, but not limited to, an electronic, magnetic, optical, electromagnetic, infrared, holographic, micromechanical, or semiconductor system, apparatus, or device, or any suitable combination of the foregoing. More specific examples of the computer readable medium may include but are not limited to a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), an optical storage device, a magnetic storage device, a holographic storage medium, a micromechanical storage device, or any suitable combination of the foregoing. In the context of this document, a computer readable storage medium may be any tangible medium that can contain, and/or store computer readable program code for use by and/or in connection with an instruction execution system, apparatus, or device. Machine-executable instructions include, for example, instructions and data which cause a computer or processing machine to perform a certain function or group of functions.

The computer readable medium may also be a computer readable signal medium. A computer readable signal medium may include a propagated data signal with computer readable program code embodied therein, for example, in baseband or as part of a carrier wave. Such a propagated signal may take any of a variety of forms, including, but not limited to, electrical, electro-magnetic, magnetic, optical, or any suitable combination thereof. A computer readable signal medium may be any computer readable medium that is not a computer readable storage medium and that can communicate, propagate, or transport computer readable program code for use by or in connection with an instruction execution system, apparatus, or device. Computer readable program code embodied on a computer readable signal medium may be transmitted using any appropriate medium, including but not limited to wireless, wireline, optical fiber cable, Radio Frequency (RF), or the like, or any suitable combination of the foregoing In one embodiment, the computer readable medium may comprise a combination of one or more computer readable storage mediums and one or more computer readable signal mediums. For example, computer readable program code may be both propagated as an electro-magnetic signal through a fiber optic cable for execution by a processor and stored on RAM storage device for execution by the processor.

Computer readable program code for carrying out operations for aspects of the present disclosure may be written in any combination of one or more other programming languages, including an object oriented programming language such as Java, Smalltalk, C++ or the like and conventional procedural programming languages, such as the "C" programming language or similar programming languages. The computer readable program code may execute entirely on the user's computer, partly on the user's computer, as a stand-alone computer-readable package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The program code may also be stored in a computer readable medium that can direct a computer, other programmable data processing apparatus, or other devices to function in a particular manner, such that the instructions stored in the computer readable medium produce an article of manufacture including instructions which implement the function/act specified in the schematic flowchart diagrams and/or schematic block diagrams block or blocks.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes and omissions may be made in the design, operating conditions and arrangement of the embodiments without departing from the scope of the present disclosure as expressed in the appended claims. Additionally, any element disclosed in one embodiment may be incorporated or utilized with any other embodiment disclosed herein.

Accordingly, the present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

What is claimed is:

1. A vehicle system, comprising:

a camera; and a controller coupled to the camera, the controller comprising at least one processor coupled to at least one memory device storing instructions that, when executed by the at least one processor, cause the controller to perform operations including:

receive data from the camera regarding at least one of an internal or an external condition of the vehicle system, the data from the camera including an indication of a temperature value regarding the at least one of the internal or the external condition of the vehicle system;

determine that the data is indicative of a certain predefined condition;

receive data from a hydrogen sensor regarding at least one of an internal or an external area of the vehicle system, the data from the hydrogen sensor including a hydrogen value;

correlate the data from the hydrogen sensor and the data from the camera in response to the hydrogen value exceeding a predefined hydrogen threshold;

determine a level of risk for the vehicle system based on the correlation by comparing the hydrogen value and the temperature value to one or more corresponding thresholds; and adjust operation of a vehicle powertrain based on the determined certain predefined condition and the level of risk.

2. The vehicle system of claim 1, wherein the instructions, when executed by the at least one processor, further cause the controller to perform operations comprising: generate a fault code in response to the determination that the data is indicative of the certain predefined condition.

3. The vehicle system of claim 1, wherein the instructions, when executed by the at least one processor, further cause the controller to perform operations comprising: generate a command to increase a power output from an electric motor to meet or substantially meet a vehicle power demand.

4. The vehicle system of claim 1, wherein adjusting operation of the vehicle powertrain comprises at least one of increasing or decreasing a power output relative to a current power output from the vehicle powertrain.

5. The vehicle system of claim 1, wherein the data received from the camera comprises at least one of data indicative of a road condition, a road grade, a road signage, or a combination thereof.

6. The vehicle system of claim 1, wherein the camera includes a thermal imaging camera.

7. The vehicle system of claim 1, wherein:

the risk level is a first level based on the hydrogen value and the temperature value being at or above a first corresponding threshold; and the risk level is a second level based on the hydrogen value and the temperature value being at or above a second corresponding threshold, greater than the first corresponding threshold.

8. The vehicle system of claim 7, wherein adjusting operation of the vehicle powertrain based on the determined certain predefined condition and the level of risk comprises:

providing a warning notification via an input/output device responsive to the level of risk being the first level, and operating a fan to cool a vehicle component, causing a coolant to flow at least partly through the vehicle powertrain, ceasing use of hydrogen fuel, or a combination thereof, responsive to the level of risk being the second level.

9. The vehicle system of claim 1, wherein adjusting operation of the vehicle powertrain based on the determined certain predefined condition and the level of risk comprises:

implementing a staged shut down by progressively decreasing a power output of one or more battery packs.

10. A method for operating a vehicle system, comprising:

receiving, by a controller, data from a camera regarding at least one of an internal or an external condition of the vehicle system, the data from the camera including an indication of a temperature value regarding the at least one of the internal or the external condition of the vehicle system;

determining, by the controller, that the data is indicative of a certain predefined condition;

receiving, by the controller, data from a hydrogen sensor regarding at least one of an internal or an external area of the vehicle system, the data from the hydrogen sensor including a hydrogen value;

correlating, by the controller, the data from the hydrogen sensor and the data from the camera in response to the hydrogen value exceeding a predefined hydrogen threshold;

determining, by the controller, a level of risk for the vehicle system based on the correlation by comparing the hydrogen value and the temperature value to one or more corresponding thresholds; and adjusting, by the controller, operation of a vehicle powertrain based on the determined certain predefined condition and the level of risk.

11. The method of claim 10, further comprising generating a fault code in response to the determination that the data is indicative of the certain predefined condition.

12. The method of claim 10, further comprising generating a command to increase a power output from an electric motor to meet or substantially meet a vehicle power demand.

13. The method of claim 10, wherein adjusting operation of the vehicle powertrain comprises at least one of increasing or decreasing a power output relative to a current power output from the vehicle powertrain.

14. The method of claim 10, wherein the data received from the camera comprises at least one of data indicative of a road condition, a road grade, a road signage, or a combination thereof.

15. The method of claim 10, wherein the camera includes a thermal imaging camera.

16. A non-transitory computer readable medium having computer-executable instructions stored thereon that, when executed by at least one processor, cause the at least one processor to perform operations comprising:

receiving data from a camera regarding at least one of an internal or an external condition of a vehicle system, the data from the camera including an indication of a temperature value regarding the at least one of the internal or the external condition of the vehicle system;

determining that the data is indicative of a certain predefined condition;

receiving data from a hydrogen sensor regarding at least one of an internal or an external area of the vehicle system, the data from the hydrogen sensor including a hydrogen value;

correlating the data from the hydrogen sensor and the data from the camera in response to the hydrogen value exceeding a predefined hydrogen threshold;

determining a level of risk for the vehicle system based on the correlation by comparing the hydrogen value and the temperature value to one or more corresponding thresholds; and adjusting operation of a vehicle powertrain based on the determined certain predefined condition and the level of risk.

17. The non-transitory computer readable medium of claim 16, wherein the computer-executable instructions, when executed by the at least one processor, further cause the at least one processor to perform operations comprising generating a fault code in response to the determination that the data is indicative of the certain predefined condition.

18. The non-transitory computer readable medium of claim 16, wherein the computer-executable instructions, when executed by the at least one processor, further cause the at least one processor to perform operations comprising generating a command to increase a power output from an electric motor to meet or substantially meet a vehicle power demand.

19. The non-transitory computer readable medium of claim 16, wherein adjusting operation of the vehicle powertrain comprises at least one of increasing or decreasing a power output relative to a current power output from the vehicle powertrain.

20. The non-transitory computer readable medium of claim 16, wherein the data received from the camera comprises at least one of data indicative of a road condition, a road grade, a road signage, or a combination thereof.

* * * * *